US00RE36704E

United States Patent [19]

Parker et al.

[11] E Patent Number: Re. 36,704

[45] Reissued Date of Patent: May 16, 2000

[54] METHOD OF FORMATTING DOCUMENTS USING FLEXIBLE DESIGN MODELS PROVIDING CONTROLLED COPYFIT AND TYPEFACE SELECTION

[76] Inventors: Michael R. Parker, 17161 Alva Rd., No. 2036, San Diego, Calif. 92127; Victor E. Spindler, 4842 Renovo Way, San Diego, Calif. 92124

[21] Appl. No.: 08/558,529

[22] Filed: Nov. 16, 1995

Related U.S. Patent Documents

Reissue of:

[64] Patent No.: 5,263,132
Issued: Nov. 16, 1993
Appl. No.: 07/590,275
Filed: Sep. 28, 1990

[51] Int. Cl.[7] ..... G06F 17/25

[52] U.S. Cl. ..... 707/542; 707/518; 707/519

[58] Field of Search ..... 395/144, 146, 395/148, 155, 161, 761, 780, 779; 707/500, 517, 518, 519, 520, 521, 526, 527, 529, 530, 531, 542

[56] References Cited

U.S. PATENT DOCUMENTS

| | | | |
|---|---|---|---|
| 4,751,740 | 6/1988 | Wright | 395/145 X |
| 4,803,643 | 2/1989 | Hickey | 395/144 X |
| 4,829,470 | 5/1989 | Wang | 395/144 X |
| 4,951,233 | 8/1990 | Fujiwara et al. | 364/523 |
| 4,970,665 | 11/1990 | Doi et al. | 364/521 |
| 5,033,008 | 7/1991 | Barker et al. | 395/148 |

OTHER PUBLICATIONS

"Styles ab–z", Zapf, Burns & Company, pp. 1–183, May, 1988.

J. Johnson & R. J. Beach, "Styles in Document Editing Systems", Computer, Jan. 1988, vol. 21, No. 1, pp. 32–43.

M. Antonoff, "Taking the Pain Out of Document Design", Personal Computing, Oct. 1987, vol. 11, No. 10.

J. Gutknecht, "Concepts of the Text Editor Lara", Communications of the Association for Computing Machinery, Sep. 1995, vol. 28, No. 9, pp. 942–960.

*Primary Examiner*—Joseph H. Feild
*Attorney, Agent, or Firm*—Micah D. Stolowitz

[57] ABSTRACT

A method for typographic design of a printed document utilizing typographical parameters designed by an expert typographer is provided. A standard body of text is executed in a standard font and a selected format by an expert design typographer to provide maximized readability of the standard body of text and to determine a set of reference parameters associated with that selected format. Utilizing the reference parameters in a computer program, an unskilled user may then execute a desired body of text in a desired font in the selected format to produce a printed document having substantially equal readability. The program allows a reader to switch between typefaces to produce printed documents having substantially equal copyfit in different typefaces. The computer program provides a method of comparing typefaces to establish allowed pairs of typefaces for heading and accent alternatives allowing a user to customize design documents with the parameter influencing text readability and copyfit automatically adjusted.

37 Claims, 27 Drawing Sheets

614

616

618

620

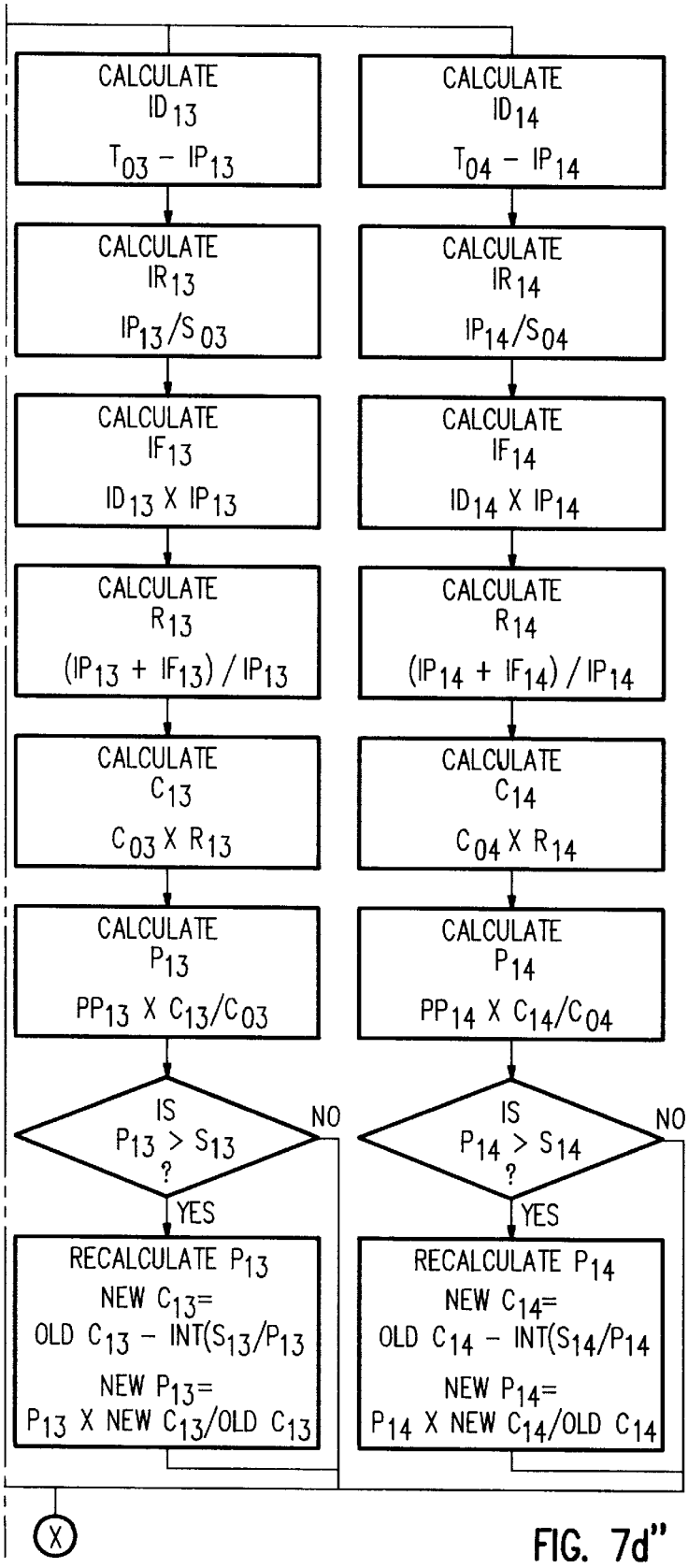
FIG. 7d"
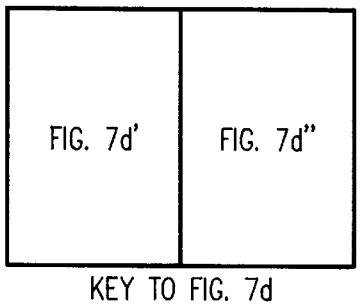

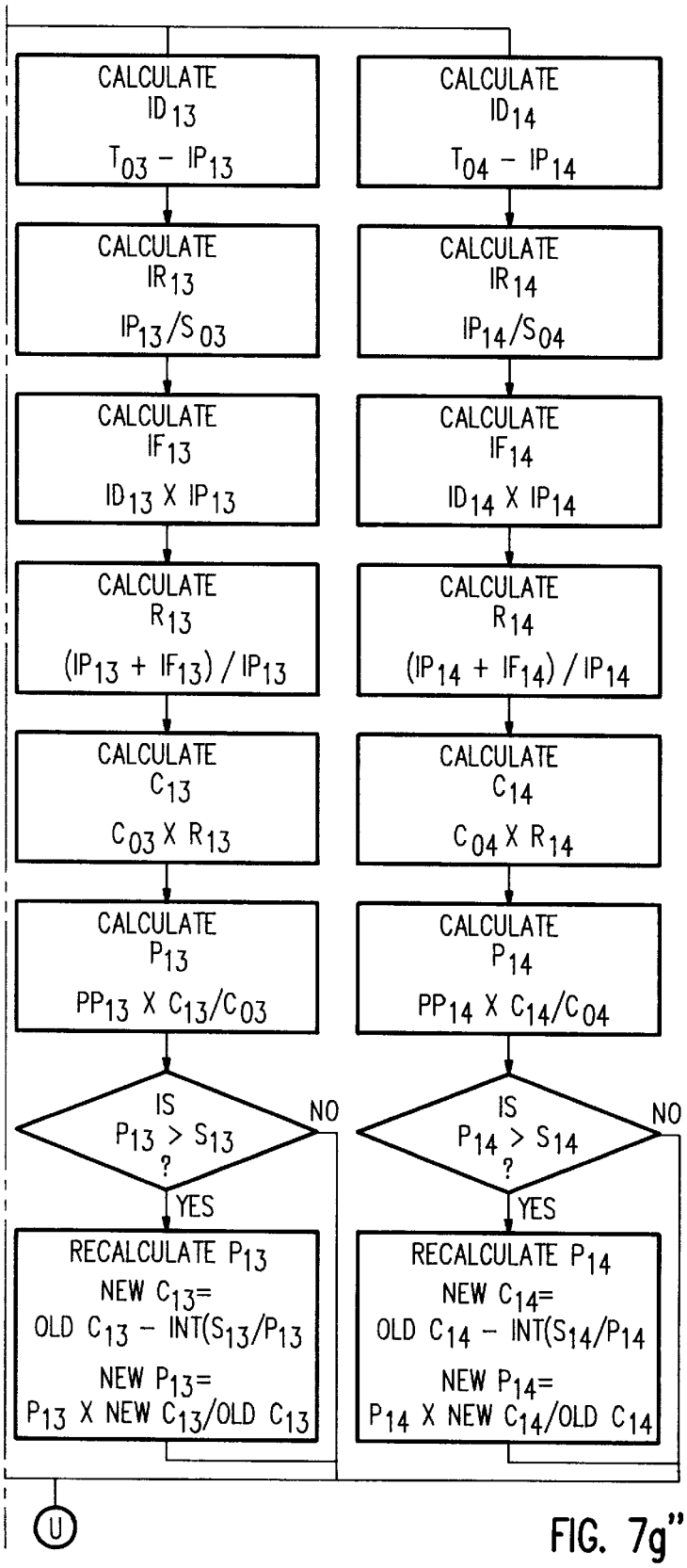
FIG. 7g"
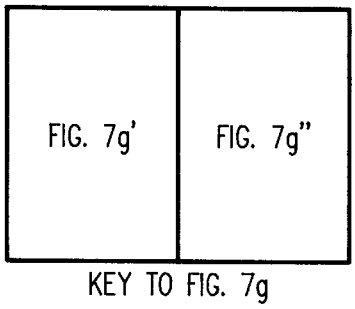
KEY TO FIG. 7g

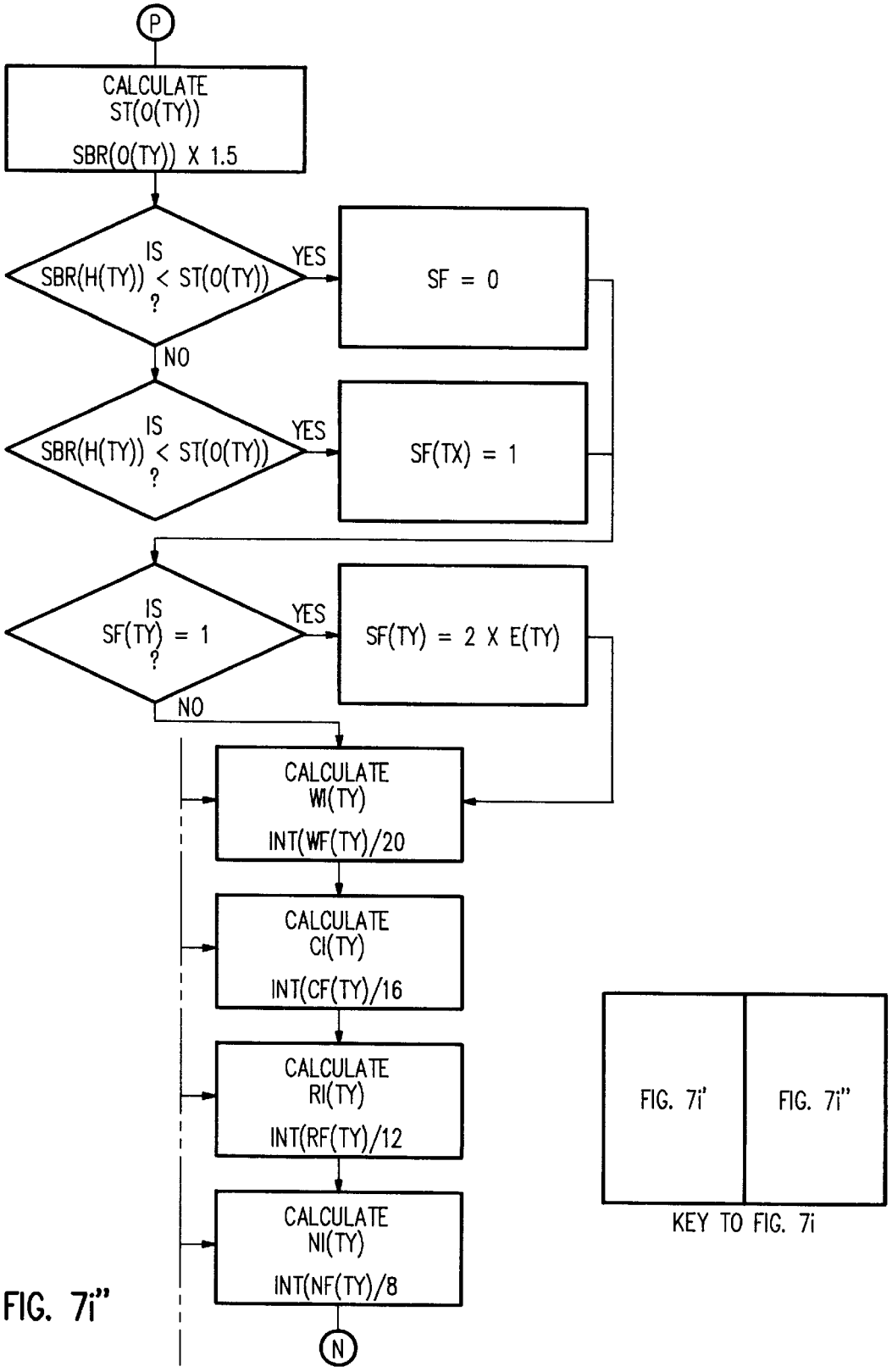
FIG. 7i"

METHOD OF FORMATTING DOCUMENTS USING FLEXIBLE DESIGN MODELS PROVIDING CONTROLLED COPYFIT AND TYPEFACE SELECTION

Matter enclosed in heavy brackets [ ] appears in the original patent but forms no part of this reissue specification; matter printed in italics indicates the additions made by reissue.

BACKGROUND OF THE INVENTION

The present invention relates generally to digital imagesetting systems and the application of specific design information to the process of document layout and publication. In particular, the present invention relates to a method of defining a document design model and an automatic process utilizing the design model to produce user documents with a user selected typeface in a user selected format in conformance with the design model.

In recent years word processing programs, computers, laser printers and other peripherals have become so powerful that it is now possible for users in small companies and large corporations alike to produce the majority of their business documents in-house. These documents include, for example, company newsletters, quarterly reports, new product announcements and customer proposals. Prior to the advent of desktop publishing technology, the majority of this work was sent out to professional graphic designers and typesetters for production.

While the page layout and style sheet programs provided by the current generation of desktop publishing technology are designed to allow a user to quickly produce well-designed documents, these projects typically become the task of the secretarial staff, who have neither the training in graphic design, nor the time to master the archaic, slow and complex user interfaces of current page layout programs. To take advantage of the graphic possibilities of laser printers for even simple projects requires command of complex professional coding in a word processor program. While carrying a normal work load, it may take a skilled person as long as six to nine months to become fully proficient with current desktop publishing programs. At best, these programs are slow to sue, invite errors and the user still doesn't understand how to design a good looking document. For each new project a user must program into the desired document the typeface from a large selection of available typefaces, the type size, or font, and the document format, i.e., the number of columns, the size of columns, section and column headings, headings and footers. Further, the appropriate typeface, style and size relative to the text typeface must be selected for the heading typeface to provide the proper emphasis. Each of these decisions is complicated by its own set of rules. The major reason for this complexity is that the current desktop publishing programs have evolved from the process wherein each of a series of design decisions is made, after consideration, by a professional graphics designer while creating and producing a document.

Current desktop publishing programs provide little or no guidance on choices, selection or placement of design elements, such as column layout, placement of page numbers, body text style, style and placement of titles and heads, and so on. Where choices are offered, they are often arbitrary and bear little relation to other design elements or decisions. In most cases, the user is free to override or modify the choices, eliminating what little value there might be in the predefined styles. Ultimately, there is no assurance that design decisions can be transmitted, applied correctly, or enforced.

Likewise, current desktop publishing systems do not address either problems of changing fonts or the use of a second (or third) accent typeface for headlines and titles. For example, if the typeface used in a 30 page report is changed from Helvetica to Times Roman, the body of the text shrinks from 30 to 22 pages. All the careful work and time expended ensuring that the last paragraph on page three did not spill over to page four and that each headline is properly placed must be done over again. At the same time, the overall look or style of the document changes, due to the change in character proportions and the ratio between filled areas (occupied by the actual text) and open areas (blank space between lines of text). Further, selection of accent typefaces for titles and headlines must be done empirically. There are no rules or processes provided to select an accent typeface (either manually or automatically) while guaranteeing that such a choice will provide sufficient contrast and emphasis between the typeface used for the text and the typeface used for the title or headline.

A typical document can be thought of as comprising a set of design elements—column layout, bodytext formatting, the bodytext itself, titles, graphic elements, and so on—placed on one or more pages. Each design element may appear in several different styles within the document, or a single style may be used throughout. The art of graphic design consists of defining styles of design elements, then combining those elements on a page to achieve a certain effect. As with any art, this skill takes both training and talent, and the knowledge and techniques are not easily transmitted nor learned.

The size of type appropriate for the document format varies between typefaces and depends on the design of the typeface. Typically, type size refers to the height of the type and is measured in units of picas and points (6 picas to the inch, 12 points to the pica). However, a reader reacts to type based on what it looks like, rather than its size, i.e., the interaction between the sizes of several elements and not on the height alone. Types of the same size may well have different widths and proportions. Conventional use of point size to specify the size of typefaces leads to irregular readability and copyfit, i.e., the amount of text in a given area of the document, between identical documents using different typefaces of the same point size.

Point size is the measurement from the highest point of the ascender to the lowest point of the descender of the lowercase characters in the typeface, along with a small increment for clearance (as shown in FIG. 1). The spaces above and below the characters are normally just sufficient to visually separate subsequent lines of type. Interline spacing, the distance in point size units from one baseline to the next, typically will be the same or somewhat greater than the type size being used.

The proportion of the height, and width, of the lowercase letters to the overall height of the letters determines the apparent size of the type. Thus, the 10-point type of one typeface will not necessarily appear to be the same size as the 10-point type of another typeface. Similarly, the number of characters in a line of one typeface will typically be different from that in a line of another typeface of the same point size. Since the size of uppercase (capital) letters varies, their height is not often used as a standard of measure. Further, point size does not relate directly to the factors that control copyfit, readability of the text and other design considerations. Those factors are principally the width of the lowercase characters, including the space to either side of them, the height of the lowercase characters (referred to as x-height), and the open or blank space from the top of one lowercase letter to the bottom of the same character on the next line up (referred to in the following description as x-space).

When the point size is used in specifying text, all other measurements, such as interline spacing and line length, must be evaluated and the point size, line length and interline spacing adjusted by an expert typographer to accommodate one of the available point sizes if rough equivalence of design effect (such as readability) and copyfit are to be achieved. Traditionally, use of this measurement was essential when it defined the key dimension of the metal blocks on which each character was cast, or when it identified key steps in available mold liners, lens stops and other key mechanical and optical stops and controls in the mechanisms of typesetting machines that controlled the size of the type, the length and assembly of the line and the places in which the lines were to be located, one below another.

Traditionally, when one changed from one typeface to another, the whole point size that would yield a result closest to that desired is chosen, and a skillful typographer, working with allowable spacing increments, must then adjust line length, space between lines, interword spacing and sometimes intercharacter spacing until a reasonable rendition of the text was obtained in the typeface. When measured against a standard, or against renditions in other typefaces, copyfit, design effect and readability of the same text vary.

Typically, emphasis is achieved in a section heading or headline by increasing the size of the textface used for the heading, and by including additional spacing between the characters. Frequently the emphasis is increased by using another member of the same typeface family, for example, boldface, italic or bold italic. A further degree of emphasis can be obtained by changing to another typeface family suitable for the heading. However, while some pairs of typefaces work well together, others do not. Most poor combinations lack sufficient difference between the pairs of typefaces. In combinations lacking sufficient contrast, the heading or display typeface appears as a mismatch to the text typeface (referred to a "textface") rather than an emphasis. By measuring the factors that effect the difference between the textface and the proposed heading typeface, an adequate degree of contrast can be assured. Typically, a trained professional typographer is required to choose a good combination.

SUMMARY OF THE INVENTION

The major advantages of the present invention lie in the provision of a flexible document design model, the simplicity of the methodology implemented, and the streamlined document formatting process resulting therefrom. Prior art methods involve placing design elements on a page manually by a professional designer, while dealing with issues of size, availability and proportion. Typically, typefaces are specified by their point size, typically expressed in integer (7, 9, 18) and coarse fraction (7½) values. Only a limited variety of typefaces were available in a limited number of point sizes, and so were usually carefully chosen for compatibility. It required a skilled typographer or graphic designer to actually select or create design elements and physically lay them out for each page of a document or other printed item.

With the advent of modern digital image composing systems, sometimes referred to as desktop publishing systems, the design and creation of printed pages, slides, etc., gained a greater flexibility. Design elements can be more easily created or specified, then placed on the page and relocated or resized as desired. Typefaces are available in fine size increments, thus increasing flexibility of the conventionally point size system. Large libraries of typefaces can be purchased and installed on these systems, thus allowing great variety of typefaces within a given document. With little or no training or skills in graphic design, individuals can and do use these systems to produce documents, slides, etc., but there is no guarantee that the results are effective. Typically, such documents do not follow or embody any accepted or desired principles of graphic design.

The present invention, as a component of a modern digital image composition system, provides a process to guide or restrict the user of such a system so as to ensure that the documents produced will reflect desired styles or effects—typically, though not necessarily, based on accepted or desired design principles. This is done through three mechanisms: separate definitions of a flexible design model embodying a desired style or styles and effects; automatic adjustment of typeface size and interline spacing to allow arbitrary typeface substitution while maintaining both copyfit and a previously defined style or effect; and automatic selection or rejection of sets of typefaces to be used together within a document.

The present invention introduces the concept of a design model: a set of design elements (typefaces, column layout, bodytext formatting, placement of page numbers, headers and footers, titles and heads, and so on), with a set of acceptable styles for each element and rules governing the selection and placement of each style of each element, including interaction with or exclusion between it and other elements in their various styles. Using an appropriate set of software tools, one person—presumably, though not necessarily, one skilled in typography or graphic design—creates one or more specific design models. The design model thus created is stored in digital form and is accessible via a computer program implementing the present invention in a digital imaging composition system. The user of the imaging composition system is then presented with the flexible design model—the set of design elements, their styles and (implicitly or explicitly) their rules—and is guided in selecting and placing specific styles of each design element upon each working area of the document. The resulting document then reflects or embodies one of the effects or styles defined by the original designer in the design model. Different design models can be created and used to achieve different groups of effects. Output from a digital imaging composition system using such design models can include (but is not limited to) printed documents, overheads and transparencies, computer graphic images, stylesheets (a computer file comprising a list of style choices, one for each design element), and templates (a computer file containing a document with certain elements—text, graphics, column format—and style choices already in place, intended to be duplicated and modified).

With modern digital image composing systems utilizing a digital pixel field, the direct scaling of a typeface outline in increments that are orders of magnitude finer than the coarse integral steps of the conventional point size system is now obtainable. In the present invention these fine increments of size are related directly to the principal elements which influence design style, readability and copyfit in each typeface, thus enabling substantially identical copyfit of a document between different typefaces for consistent design and readability.

The present invention requires that one or more typographic formats in which the copyfit of a sample text has been properly balanced against desired style and readability in a standard typeface of known proportions be established by a given person, typically (though not necessarily) an expert typographer. The present invention then allows rapid substitution of other desired typefaces, each one tuned to identical copyfit having the same design effect—the balance between level of readability and amount of text—as the original format.

The present invention further provides a method of comparing typefaces to determine if sufficient contrast exists between a pair of typefaces for effective use of a text/heading combination within a document. The difference between the principal elements that establish a different look to a typeface are analyzed for each pair of typefaces being compared. If insufficient contrast exists between the two typefaces, the combination is not permitted for use as a text/heading pair. If the differences are great enough to establish a clear contrast, the combination is allowed. In the same manner, if the difference analysis establishes that one of the pair or a third typeface is extreme when compared to one or both typefaces of the proposed pair, it can be allowed for use as an accent typeface within the text body or for fixed headings, such as chapter headings.

The heart of a typeface design is a repeating set of elements that establish the common design for all of the characters. For this reason, the contrast between typefaces can be quantified by comparing relatively few characters. Various measurements of selected uppercase and lowercase characters in each typeface are compared to each other, and size measurement ratios established. The ratios associated with each typeface are then scaled, and a quantitative measurement or value is established for each ratio. The ratio values thus determined are summed; if the difference between ratio totals for a pair of typefaces is less than a predetermined constant, then those typefaces are not sufficiently distinct to be utilized for a test/heading combination. If the difference between the ratio totals for the pair of typefaces equals or exceeds the predetermined constant, the combination is permitted. Similarly, typefaces that are intended for use as accent faces can be calibrated for extremity. If any of four predefined calculations associated with a typeface are sufficiently extreme, the typeface is suitable for use at an accent typeface. Thus, the present invention allows the unskilled user to mix two or three typeface families in a document confident that permitted combinations will perform effectively without the services of an expert typographer.

The document design system of the present invention implemented in software provides a computer program for use with modern desktop computers which enables the typographically unskilled operator of a small digital publishing system to rapidly and comfortably use a variety of different formats and typefaces across a variety of different work. His or her assurance of obtaining coherent text copyfit at a consistent level of readability and with a consistent design style cannot be equalled by the most skilled of typographers who are limited to conventional means. Such a computer program allows the untrained user to obtain the variety of appearance for the text of his or her documents of whatever kind provided by the many hundred of popular text typeface families commercially available in predefined digital typographic formats. This richness and variety of appearance is obtained with no loss of efficiency or speed and without the lengthy and complex adjustments, which often require expert judgement, required by prior art desktop publishing systems.

The preferred embodiment of the present invention is shaped to enable the unskilled office worker to effectively operate advanced word processing or desktop publishing systems while employing many different typeface families in order to enrich the appearance of his or her documents in a professional manner while maintaining fixed copyfit and level of readability.

Professionally produced documents of graphic arts quality typically fill a fixed number of pages of any size specified by the designer. Other embodiments of the present invention may be implemented to similarly provide the professional graphics designer in the choice of text area and page dimensions and layout in order to prepare a given text in one or more chosen typefaces with exact copyfit while preserving a high level of readability to fill a given text area.

BRIEF DESCRIPTION OF THE DRAWING

A fuller understanding of the present invention would become apparent from the following detailed description taken in conjunction with the accompanying drawing which forms a part of the specification and in which:

FIG. 2b is a flow diagram illustrating the production of a desired document utilizing an arbitrary typeface with a selected predefined format of FIG. 2a;

FIG. 5b is a flow diagram illustrating the production of a desired document utilizing the design models shown in FIG. 5a;

DETAILED DESCRIPTION OF THE PREFERRED EMBODIMENTS

Figure 1:
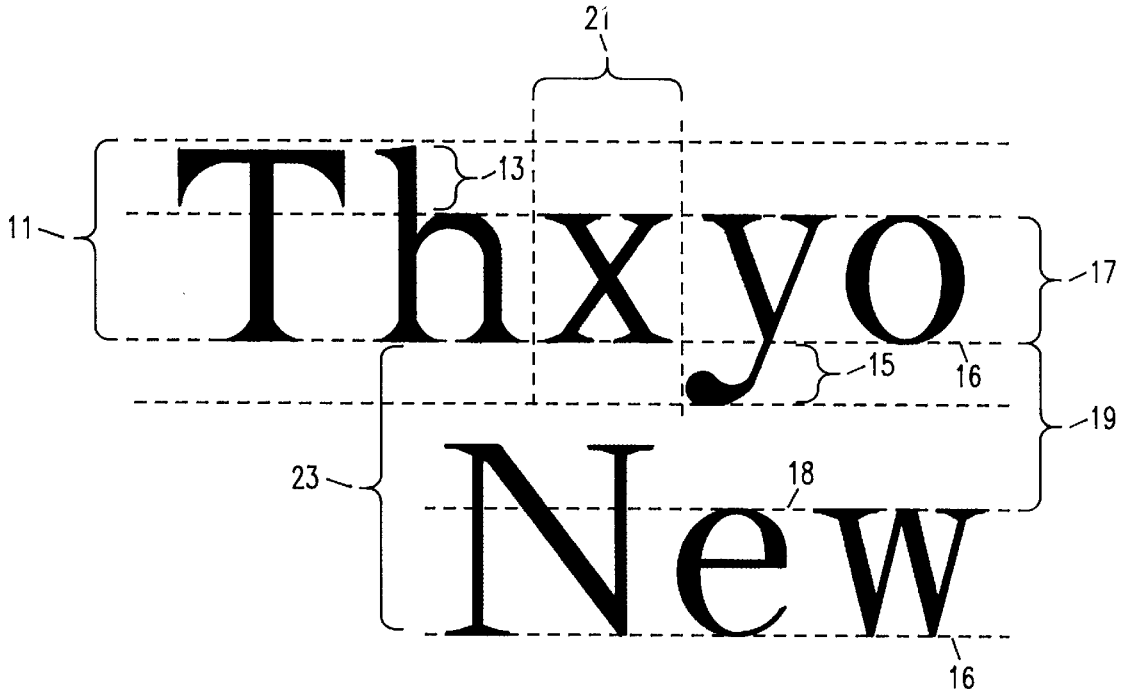
FIG. 1 is diagram illustrating selected characteristics and features of an arbitrary typeface.

Referring now to FIG. 1, selected characters taken from an arbitrary typeface at an arbitrary type size are shown. Literally hundreds of different typefaces are commercially available in electronic format (known as bitmap fonts or outline fonts) for use with today's word processing programs. Since the size of type depends on the design of the typeface, one typeface may look small relative to another, even though both are of the same size. Conventionally, type is measured in picas and points (6 picas to the inch, 12 points to the pica). The point size 11 of type is measured from the highest point of the ascender 13 to the lowest point of the descender 15 (i.e., the strokes that extend above and below the main part of the letters) plus an incremented amount to provide clearness. The proportion of the main part of the letter, i.e., the body of the lower case character referred to as the "x-height" 17, to the overall size 11 of the letter determines the apparent size of type. For the purposes of the present invention, the "x-space" 19 is defined as the vertical distance from the baseline 16 of one line of type to the top line 18 of the next lower line of type on a page while the interline spacing 23 between lines of type is defined as the vertical distance between the baselines 16 of vertically adjacent lines. Note that the top line 18 for a line of type is equal to the baseline 16 plus the x-height 17 for that line of type.

The readability of a document, i.e., the ease and comfort in reading printed text, is influenced by several factors which make type easy to take and attractive to read. Comfortable reading is the result of the ratio of the line length to the size of the type. The basic format of a document, the line stretching the width of the page or two or three columns per page, for example, determine line length. While type size, or the type width 21, and line length determine the number of characters per line, the basic guideline is that the larger the type utilized, the longer the line should be. Readability is also greatly influenced by the x-space 19. The combination of these three factors provide the greatest influence on readability of the printed document. The task of the expert typographer then necessarily includes design of the document format and selection of the appropriate typeface and size to produce the desired document. Using the selected typeface then, the values for type size 11, line length, and x-space 19 are adjusted with respected to each other to provide the desired document with a high level of readability in a desired format. Alternatively, these readability factors may be adjusted to provide a text design which produces a desired affect on a reader, or to provide a customized or unique "look", possibly with the sacrifice of some degree of readability.

Figure 3:
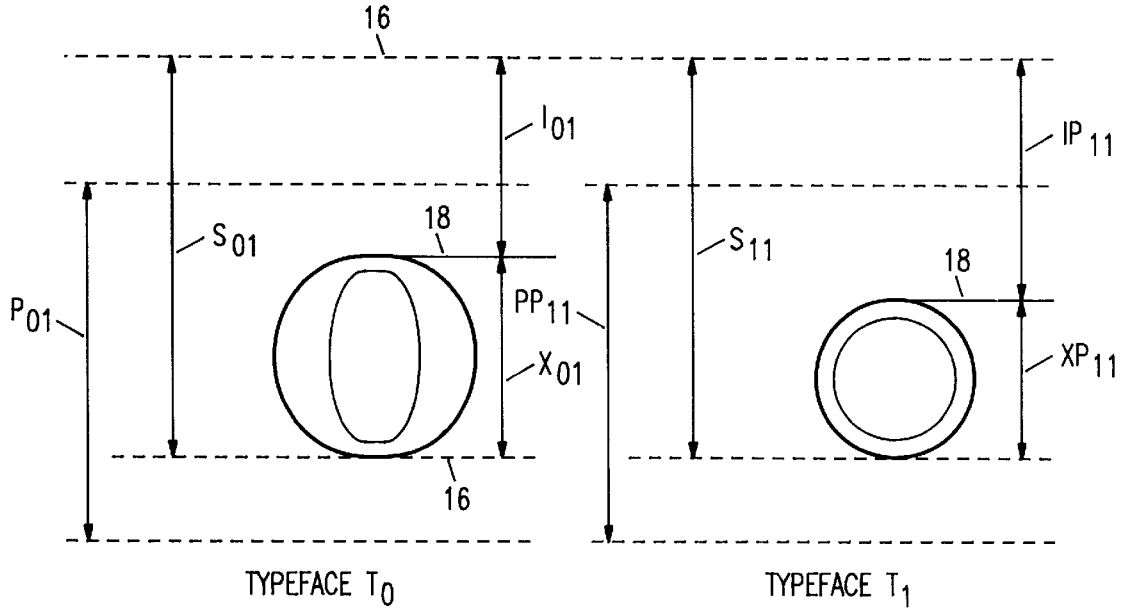
FIG. 3 is a diagram illustrating various values for an arbitrary character to be utilized in the document production as shown in FIGS. 2a and 2b.
Figure 2A:
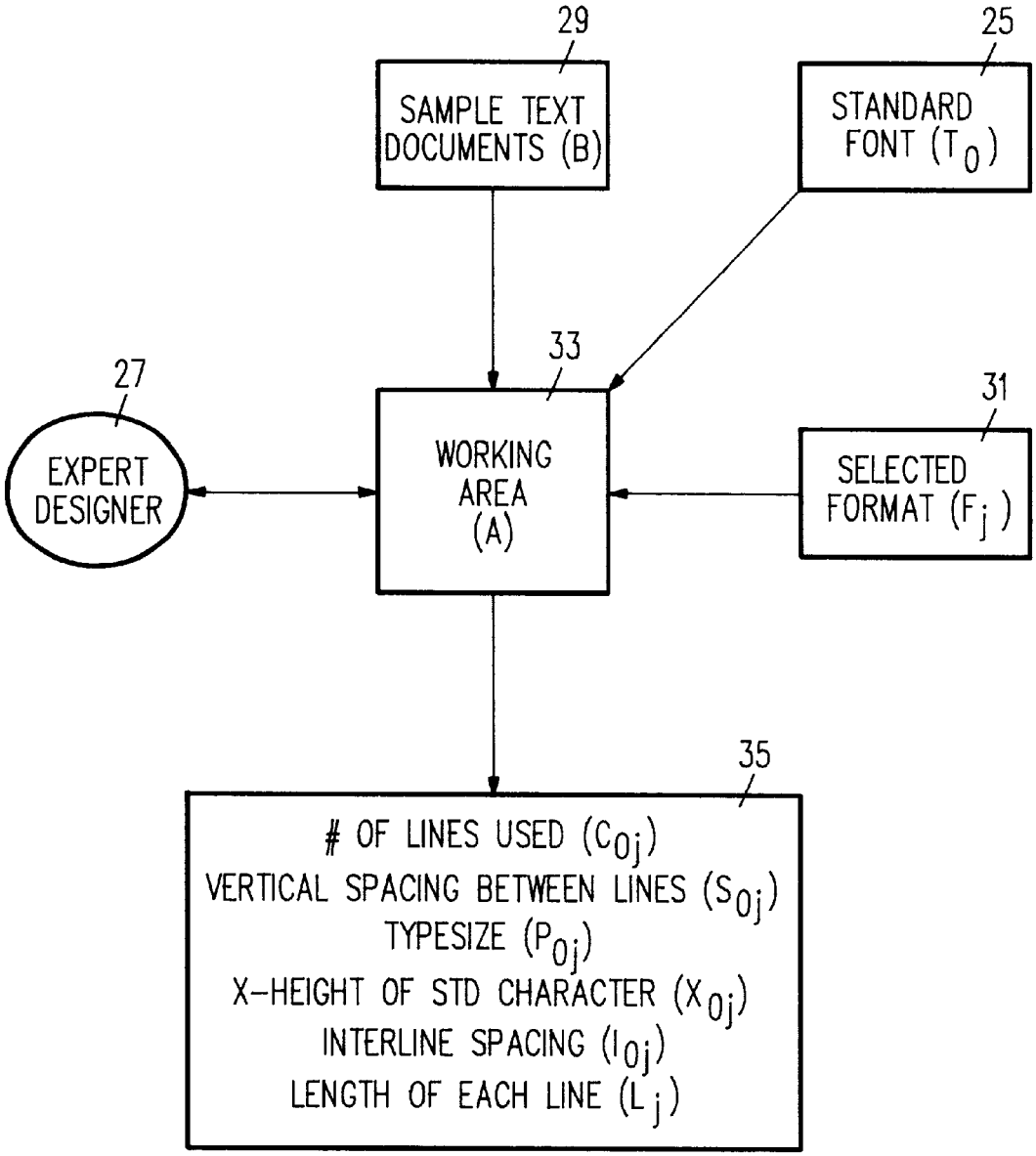
FIG. 2a is a flow diagram illustrating the production of predefined standard formats in accordance with the principles of the present invention.
Figure 2B:
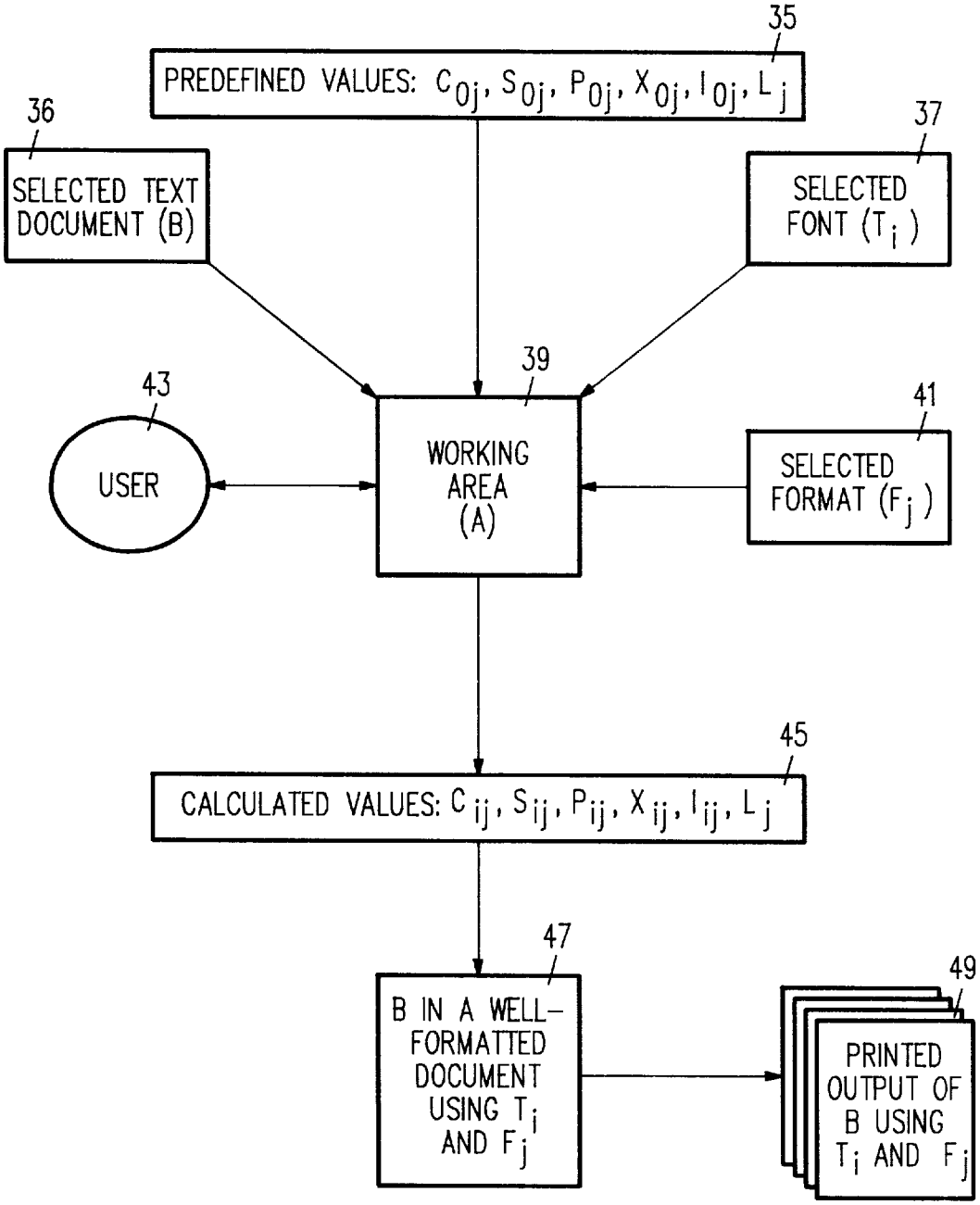

Referring now also to FIGS. 2a , 2b and 3, FIGS. 2a and 2b are a flow chart illustrating a document formatting process in accordance with the principles of the present invention. FIG. 2a illustrates the definition of a standard font, $T_0$, selected by an expert typographer 27 from a desired typeface to set a standardized body of sample text in a standardized working area 33 in a selected format, $F_j$, 31. (A font is a set of characters of a particular typeface at a specified size, including all the uppercase and lowercase letters, punctuation marks, numerals, and other characters associated with that typeface.) While the standard font thus selected may be any arbitrary font which suits the expert designer's needs, typically the standard font is selected from the general range of available typefaces in use by appropriate users. Similarly, the format $F_j$ may be selected from any available predefined document format or, alternatively, the expert designer may defined a format to fit particular needs or to achieve a desired effect. Ideally, the selected standard font comprises a typeface in which the type characteristics such as the x-height 17 and the character width 21 (as shown in FIG. 1) will represent medium values between extremes of the available typefaces. While the type size 11 typically refers only to the height of the type, the width 21 is related to the type height in a given typeface by a set of predefined parameters, therefore specifying the type size for a typeface also specifies the type width 21 in that typeface. Using the selected standard font, the expert designer 27 sets the body of standard sample text 29 in working area 33 using a selected format 31 while adjusting the type size 11, x-space 19, line length $L_j$ (not shown) and the number of lines of type per column or page to provide a document having maximum readability and comfort to a reader when the document 33 is printed out. The skill and experience of the expert designer 27 is thus used to provide a table of values 35 for the standard font 25 associated with a selected format 31 which provides maximum readability of the standardized sample text 29. This process may be repeated a number of times to provide a number of tables of values 35, each one associating the standard font 25 with a different format, $F_j$, 31.

Using the above process, a unique table of values 35 for each selected format, $F_j$, 31, will be defined, which when applied to an arbitrary font $T_i$ will ideally produce an equal number of characters per page of selected text B in any selected format $F_j$. The type size $P_{0j}$ for the standard font, $T_0$, 25 specified in table 35 is specified in arbitrary units with the size of the standard font $T_0$ equal to 1.00. Alternatively, conventional units of points may be used to specify point size in small increments of one-one hundredths of a point. The type size for the standard font $T_0$ is determined by the expert designer to provide the desired style utilizing a normal weight of the roman type for each typeface family.

To provide a professional variety of typographic emphasis, each typeface family utilized will consist of roman, italic, bold roman and bold italic styles. The type size assigned to the italic, bold roman and bold italic members of the standard font $T_0$ typeface family will be exactly that of the roman $T_0$, since they have been designed in close proportion to the roman to provide a planned degree of emphasis to the characters and words in the text for which they are used.

Since the tables of values 35 are derived for a standard typeface of normal proportions, typefaces of condensed or extended proportions may not produce the desired result. The lowercase characters for condensed or narrowly proportioned typefaces will be too large with too little interline space, leading the typeface to appear to be too large, dark and crowded for comfortable reading. The lowercase characters for extended or widely proportioned typefaces will be too small with too much interline space, leading the typeface to appear too small, with lines spaced too far apart for maximum ease and readability. Therefore, tables of values 35 must also be determined which correspond to any modified proportions of the standard font typefaces. The number of lines in the column/page and the size and number of characters are adjusted until the proportion between the x-height 17 of the lowercase characters and the interline spacing 23 between lines is substantially equal to that for the normal $T_0$ while maintaining the same amount of text per column and per page. For maximized readability of the most condensed typefaces, the height of the lowercase characters will be slightly smaller than anticipated; for the most extended, slightly larger.

Table I provides a list of the variables and their definitions used throughout this description.

The process of defining a standard font $T_0$, comprises the following steps. Define A to be the size, shape and location of an area to be occupied by text set in type, for example, a rectangle 52 picas and 3 points high by 39 picas and 6 points width defined on a standard page of 8½×11 inches. Let $T_0$ be a single scalable typeface, in the preferred embodiment, ITC Bookman Roman, chosen to represent normal roman proportions. Let SB represent a standard body of text chosen to represent normal English text of average word length, character frequency and composition.

TABLE I

| NAME | DESCRIPTION |
|---|---|
| A | area to be filled with text |
| SB | standard body of text used to fill A |
| B | user selected body of text |
| $BW_{ij}$ | cumulative length of text B using $T_i$, $F_j$ |
| $C_{ij}$ | number of lines used to fit B into A using $T_i$, $F_j$ |
| $F_j$ | format (area(s) of text placement) used for A (j = 1 . . . n) |
| $I_{ij}$ | x-space in A when $T_i$, $F_j$ are used |
| $ID_{ij}$ | difference in x-space (= $I_0 - IP_{ij}$) |
| $IF_{ij}$ | fractional part of ID (= $I_{0j} - IP_{ij}$) |
| $IP_{ij}$ | preliminary x-space |
| $IR_{ij}$ | x-space ratio (= $IP_{ij}/S_{0j}$) |
| $L_j$ | length of lines in $F_j$ |
| $P_{ij}$ | type size of $T_i$ used in $F_j$ |
| $PI_{ij}$ | theoretically correct type size of $T_i$ used in $F_j$ |
| $PP_{ij}$ | preliminary type size |
| $R_{ij}$ | adjustment ratio for $T_i$ used in $F_j$ (= $1 + IF_{ij}/IP_{ij}$) |
| $S_{ij}$ | vertical spacing between lines for $T_i$, $F_j$ |
| $T_0$ | standard typeface |
| $T_i$ | alternate typeface used, i = 1 . . . m |
| $X_{ij}$ | x-height of standard character in $T_i$ when used in $F_j$ |
| $XP_{ij}$ | preliminary x-height of standard character with $T_i$, $F_j$ |
| i | running index for typeface |
| j | running index for format |
| RI, CP, XD, XR, XF, RX | temporary variables |

In format $F_1$ in area A, let $C_{01}$ represent the number of lines of text of constant length $L_1$ with vertical spacing $S_{01}$ from baseline 16 to baseline 16 filling the one or more columns of $F_1$ that, in turn, fill area A when set in the standard typeface having size $P_{01}$. $P_{01}$ is the size of the standard font $T_0$, expressed in small increments of arbitrary units ($P_{01}$=1.00 for $T_0$), chosen in connection with $C_{01}$, $L_1$ and $S_{01}$ by a given person, such as an expert typographer, to provide the reader a desired style and level of readability when reading text SB within text area A in $F_1$. All values are then stored in table 35.

Define a second format, $F_2$, and subsequent formats, $F_j$, such that $C_{02}$, $L_2$, $S_{02}$ and $P_{02}$, $C_{0j}$, $L_j$, $S_{0j}$ and $P_{0j}$, each provide alternative column and text arrangements within the defined text area A each chosen by a given person, such as an expert typographer, to give the reader the desired style and level of comfort and readability that can be obtained with each format, $F_j$, when using typeface $T_0$. The amount of standard text SB to be fitted into text area A in each different format will vary as a function of the particular format, $F_j$, utilized.

When a second typeface, $T_1$, is substituted for typeface $T_0$ in any of the formats, $F_j$, without changing any of the typeface constants, including type size, the readability of the standard text SB and the number of pages it occupies will change (unless typeface $T_1$ is identical in all critical dimensions with typeface $T_1$). FIG. 2b is a flow chart illustrating a style-matching and copyfit process which automatically applies the data, table 35, derived by the expert design process (described with reference to FIG. 2a) to the second typeface $T_1$, to provide a second document in a selected format, $F_j$, having the same copyfit (i.e., same number of characters per page, same number of pages) and readability as a first document in the same format, $F_j$, with identical text set in the standard font $T_0$. Thus the present invention allows new typefaces $T_i$ to be introduced without changing the size of the area occupied by the body of text while retaining the desired level of readability and comfort for the reader, without the intervention of the original designer (such as an expert typographer).

With continuing reference to FIGS. 2b and 3, the document formatting process in accordance with the principles of the present invention generally allows a user 43 to set an arbitrarily selected body of text B, 36, into a working area 39 using an arbitrary font $T_j$, 37, in an arbitrary selected document format $F_j$, 41, to achieve a printed document 49 having the same level of readability and comfort for the reader as achieved by the original designer using the standard font $T_0$. The predefined values 35 determined by the original designer and associated with the selected format $F_j$, 41, are applied to the selected font $T_i$, 37, to determine a set of values 45 which allows the selected text 36 to be formatted in a document 47 using the selected font $T_i$ and selected format $F_j$. The document 47 will have the same level of readability and the same length as a document containing the same selected text 36 set in the standard front $T_0$ in the selected format $F_j$. Once a selected body of text 36 have been formatted to a document 47 utilizing a selected typeface $T_i$ and selected format $F_j$, the typeface may be changed at any time to produce a new document formatted with the alternate typeface in the same format having the same level of readability in substantially the same length document.

First a lateral measure of the character width 21 of typeface $T_1$ is established, including a weighted measure for the frequency of use of each character. The width measurement is determined utilizing well-known algorithms in a microprocessor by composing and recomposing the arbitrary body of text B in a selected format $F_j$, for example, using $C_{01}$, $L_1$ and $S_{01}$ from table 35 unchanged, but varying type size until B exactly occupies the same area set in typeface $T_1$ as with typeface $T_0$. The resulting type size is the preliminary type size for typeface $T_1$ in format $F_1$, or $PP_{11}$.

If the proportions of typeface $T_1$ are normal and similar to typeface $T_0$, $PP_{11}$ will be the approximate type size required for typeface $T_1$ in $F_1$, or $P_{11}$. If the proportions of typeface $T_1$ are much more condensed or extended than the normal proportions of typeface $T_0$, although copyfit is equal, readability will suffer from too little or too much space between the lines.

In order to provide equivalent readability with different typefaces, $T_i$, and different formats $F_j$, and substantially equal copyfit in the same format with different typefaces, the ratio between the height of x-space 19 and the height of the lowercase letters 17 must be maintained. The x-height 17 of a standard character, lowercase "o" in the preferred embodiment, and the x-space 19 is measured, $X_{01}$ and $I_{01}$, respectively, for typeface $T_0$ at $P_{01}$ and $XP_{11}$ and $IP_{11}$, respectively, for typeface $T_1$ at $PP_{11}$ to derive an adjustment ratio, $R_{11}$.

The theoretical adjustment ratio, $R_{11}$, for using typeface $T_1$, in format $F_1$, multiplied by $S_{01}$, provides the vertical spacing between lines for $T_1$ in $F_1$, $S_{11}$. The theoretical number of lines to be added or dropped for format $F_1$ in typeface $T_1$ is then calculated. Since in most cases $R_{11}$, when used to multiply $S_{01}$, will produce the abstract presence of fractional lines, the result cannot be used without rounding to the nearest integer number of lines, $C_{11}$. Thus, to obtain $C_{11}$, the correct number of lines for typeface $T_1$ in format $F_1$, multiply the number of lines of typeface $T_0$ in the column, or $C_{01}$, by $R_{11}$, and round to the nearest integer number. $P_{11}$, the correct value for the type size of typeface $T_1$ in format $F_1$ can then be found by re-copyfitting the arbitrary body of text B so that the end of the last column/page of full text in format $F_1$ when set in typeface $T_1$ at $C_{11}$ lines per column occurs at the same word as when the text B is set in format $F_1$ in typeface $T_0$ at point type $P_{01}$ at $C_{01}$ lines per column.

Alternatively, the reciprocal value could be calculated from $C_{11}$ or $R_{11}$ rounded off. The final type size for typeface $T_1$, $P_{11}$, in format $F_1$ is calculated by multiplying $PP_{11}$ by the ratio of $C_{11}$ divided by $C_{01}$.

$$P_{11}=P_{01}C_{01}/C_{11}$$

To calculate $R_{11}$:

1. Determine the increment change $ID_{11}$, the difference between the x-space 19 in typeface $T_0$ at point size $P_{01}$, $I_{01}$, and the x-space 19 in typeface $T_1$ at preliminary point size $PP_{11}$, $IP_{11}$, by subtracting $I_{01}$ from $IP_{11}$;

$$ID_{11}=I_{01}-IP_{11}.$$

2. Determine $IR_{11}$, the fraction of the interline spacing between baselines of typeface $T_0$ in format $F_1$, $S_{01}$, represented by the x-space 19 in typeface $T_1$ in preliminary type size $PP_{11}$, or $IP_{11}$, by dividing $IP_{11}$ by $S_{01}$;

$$IR_{11}=IP_{11}/S_{01}.$$

3. Determine $IF_{11}$, the fractional part of the increment $ID_{11}$ proportional to $IR_{11}$, the x-space 19 of typeface $T_1$ in preliminary type size $PP_{11}$, over the space between baselines by multiplying $ID_{11}$ by $IR_{11}$;

$$IF_{11}=ID_{11}\ IR_{11}.$$

4. Then determine $R_{11}$ by adding $IF_{11}$, the fractional part of the increment $ID_{11}$ to $IP_{11}$, the x-space 19 in typeface $T_1$, and dividing the sum by $IP_{11}$;

$$R_{11}=(IP_{11}+IF_{11})/IP_{11}.$$

The corrected type size ratio for typeface $T_1$, $P_{11}$, is calculated by similar logic;

$$P_{11}=1+((X_{01}-XP_{11})XP_{11}/S_{01})/XP_{11}$$

To find $S_{11}$, the space between lines set in typeface $T_1$ at size $P_{11}$ in format $F_1$, divide the vertical dimension (i.e., the height of a column) of $F_1$, by $C_{11}$;

$$S_{11}=F_1\text{height}/C_{11}$$

For maximum consistency of style and readability, the rounding of the calculated number of lines to obtain $C_{11}$ should be increasingly down to a lower number of lines as a typeface is reduced or condensed, and up to a higher number of lines as a typeface is enlarged or extended. The above described process may be summarized as follows:

-set B into A using $F_j$; store length ($BW_{0j}$)

-change to desired typeface $T_i$

-adjust $PP_{ij}$ until $BW_{ij}=BW_{oj}$

-measure x-height ($XP_{ij}$)

-measure change in x-height ($ID_{ij}=XP_{ij}-X_{0j}$)

-calculate interline spacing factor ($RI-1+ID_{ij}/S_{0j}$)

-calculate theoretical number of lines ($CP=F_j\text{height}/S_{ij}$)

-round to nearest integer number of lines ($C_{ij}$=integer (CP+0.05)

-adjust interline spacing ($S_{ij}=F_j\text{height}/C_{ij}$) For substantially identical readability -adjust $PP_{ij}$ until $X_{ij}=XP_{ij}(S_{ij}/S_{ij})$ For best copyfit of text -adjust $PP_{ij}$ until copyfit is achieved Alternatively, a copyfit factor or ratio can be introduced to allow a desired copyfit, for example, 75% or 10% copyfit, to be achieved rather than equal copyfit.

For typefaces of narrow character width combined with tall capitals and/or ascenders and/or long descenders, portions of characters from one line may overlap parts of characters in lines immediately above or below for the value of $C_{11}$ thus obtained. $S_{11}$ and $P_{11}$ then are incorrect (faulty) and must be recalculated to correct the condition. $P_{11}$ is compared to $S_{11}$. If $P_{11}$ is greater than $S_{11}$, $C_{11}$ is reduced by the ratio of $S_{11}/P_{11}$ and rounded to the next lower integer. The new or corrected $P_{11}$ is then found by multiplying the faulty $P_{11}$ by the corrected $C_{11}$/faulty $C_{11}$.

This correction process results in smaller than optimal lowercase characters, but capitals, ascenders and descenders will not overlay and the solution will represent the best fit for that particular typeface.

For each new typeface, $T_i$, and each new format $F_j$, a similar series of calculations is required to produce a table of values 45 unique to each combination of $T_i$ and $F_j$. Each format $F_j$ will then produce substantially equal copyfit and consistent readability in any of the typeface families $T_i$ that are available to the user.

If coarse results are sufficient, the value for the adjustment ratio $R_{11}$ need not be calculated. A constant $K_j$ can be assigned as a value for the ratio of white space between lines, $I_{0j}$, to interline spacing 23 from baseline 16 to baseline 16, $S_{0j}$, for each standard font, $T_0$, used. The gain is simplicity. One calculation may be used for all formats in one typeface. The loss is refinement; spacing between lines will vary imperceptibly, and copyfit will vary between typefaces in a given format by as much as one half a line per column.

Figure 4A:
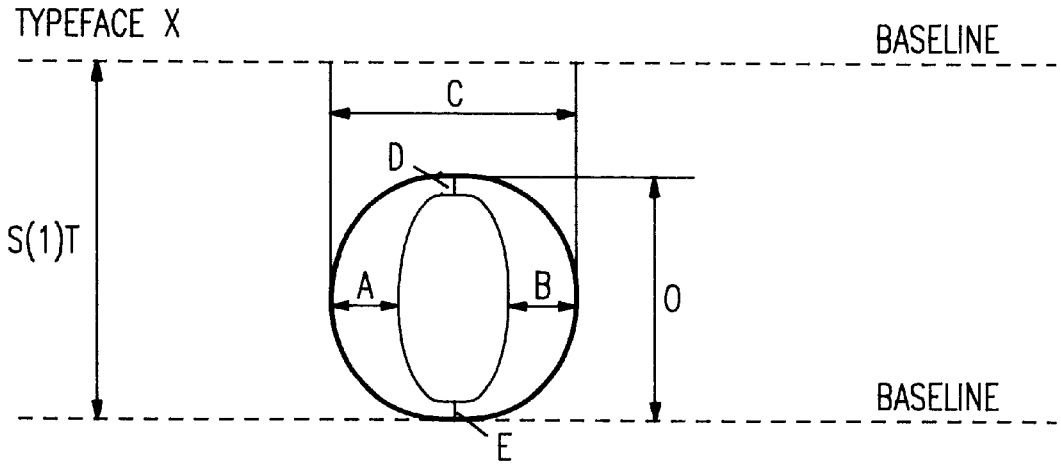
FIGS. 4a and 4b are diagrams illustrating various values for an arbitrary standard character utilized for determining suitability of a selected typeface for use as a heading in accordance with the principles of the present invention.
Figure 4A:
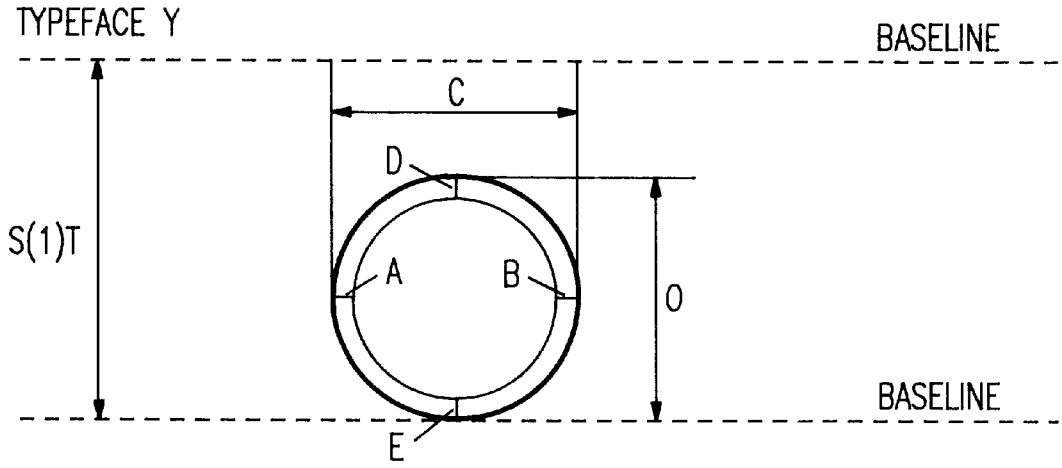
Figure 4B:
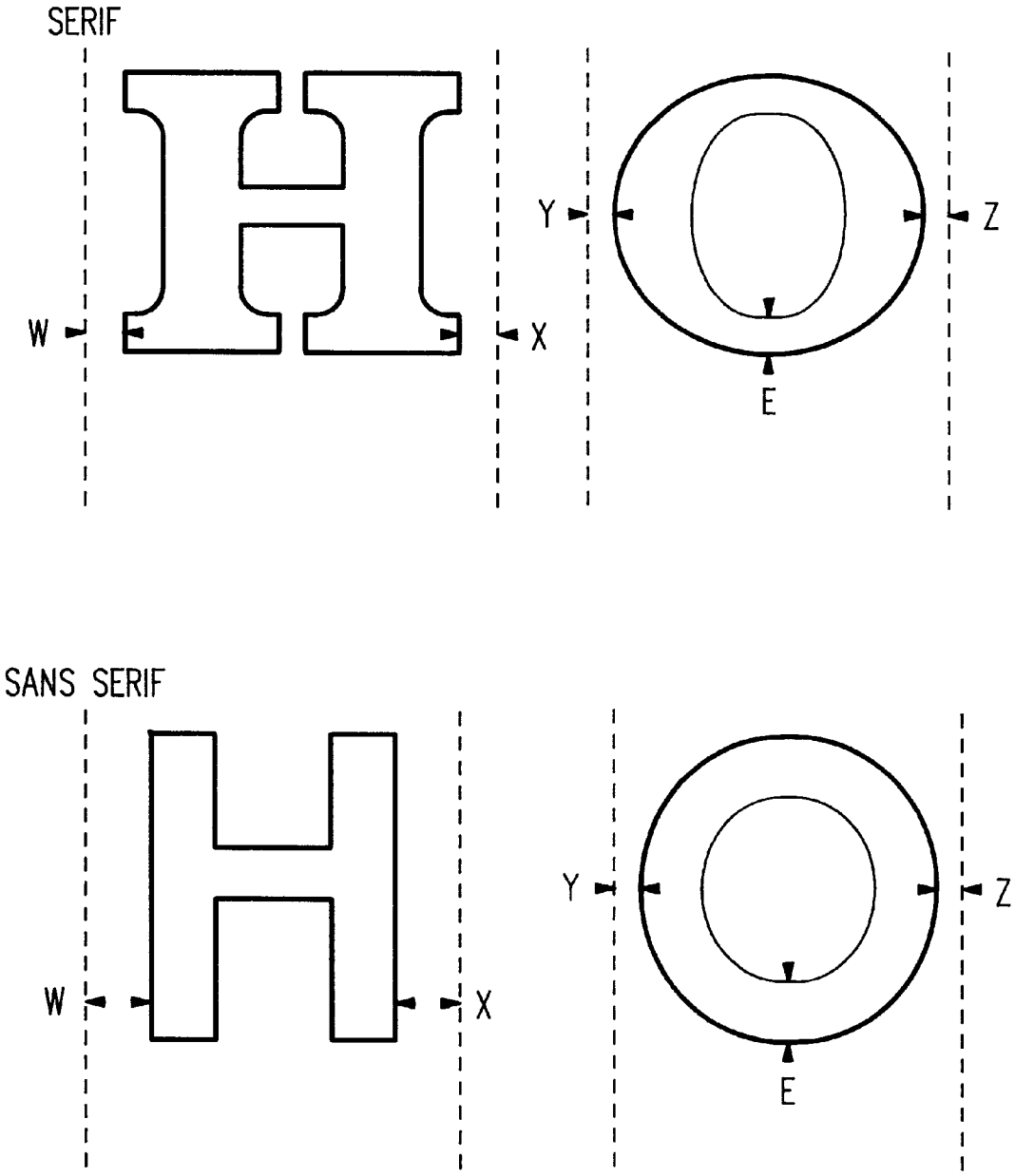

Referring now also to FIGS. 4a and 4b, a method of selection of typeface pairs having predetermined contrast therebetween in accordance with the present invention is described. Headings are utilized in a document to blend meaning with visual form or appearance. Headings describe the content of the text in the document body while at the same time drawing the reader's attention to focus on a desired segment of text. In order for a heading to provide the desired effect on the reader, sufficient contrast between the type utilized for the heading and the type utilized for the body of text must be provided. The method of the present invention provides an automatic comparison between a pair of selected typefaces to determine suitable pairs of typefaces for text/heading combinations in a printed document.

To provide the most meaningful result, the proposed typefaces should be compared at equivalent sizes. If the conventional measure of point size is used, the two typefaces may have differing apparent sizes and performance characteristics. While the typefaces may be compared at identical type sizes, the results may be somewhat skewed and may not produce effective text/heading typeface combinations.

The value for type size, $P_{ij}$, determined in the copyfit process described above with reference to FIG. 2b provides suitable equivalent type sizes for comparison of different typefaces $T_i$.

The comparison is accomplished by comparing certain repeating elements in the lowercase characters. The preferred embodiment utilizes the uppercase "H" and "O" and the lowercase "o", and a baseline 16 to baseline 16 measurement. The same or similar measurements may be obtained by utilizing alternative characters.

For the purpose of comparing a pair of typefaces $T_i$ to determine a text/heading typeface pair, a heading or accent typeface is defined as TY while the typeface utilized for body of print text is defined as TX. At $P_{11}$ and $P_{21}$, the equivalent type size is for TX and TY, respectively, find both the uppercase H and O and lowercase o in typefaces TX and TY and measure the dimensions A, B, C, D, E as shown in FIG. 4a. The values for x-height, $X_{ij}$, and vertical space between baselines, $S_{ij}$, are derived from the copyfit process while deriving the determination of the equivalent type size. The lowercase o is chosen for its simplicity and the ease in finding all principal characteristics with the exception of the presence or absence of serifs. A value for each of six comparison factors must then be calculated for each typeface TX and TY.

For typeface TX:

1. Establish the weight factor, WF, of each typeface;

$$WF=(X_{01}(A+B)+C(D+E)) / (X_{01}C).$$

2. Establish the contrast factor, CF, of each typeface;

$$CF=(\text{The larger of A or B})/(\text{The smaller of D or E}).$$

3. Establish the regularity factor, RF, of each typeface;

$$RF=(\text{The greater of A or B}-\text{the lesser})+(\text{The greater of D or E}-\text{the lesser}).$$

4. Establish the narrowness factor, NF, of each typeface;

$$NF=C/X_{01}.$$

5. Establish x-height factor, XF, of each typeface $$XF=X_{01}O/S_{01}.$$

With continuing reference to FIG. 4b, to determine the presence or absence of serifs, compare the sum of the left and right sidebearings of the H, (W+X), with the sum of the left- and right-hand sidebearings of the 0, (Y+Z). If (W+X) is less than or equal to one and a half times (Y+Z), or (W+X)<(Y+Z), the typeface has serifs. If (W+X) is greater than one and a half times (Y+Z), or (W+X)>(Y+Z), then the typeface is of a sanserif design.

6. For sanserif faces, the serif/sanserif factor, SF, is the value 0;

$$SF=0.$$

For serif faces, the serif/sanserif factor, SF, is the value of E (as shown in FIG. 4a) multiplied by 2;

$$SF=2E.$$

Each of the values 1–6 must be transformed to a set of scaled increments to reflect the importance of each of the comparison characteristics in establishing the appearance of the typeface as follows.

1. Weight: Take the values obtained for the Helvetica Ultra Thin typeface as one extreme and the Helvetica Compressed typeface as the other extreme and divide it into twenty increments, assigning digital values 0–19. Round WF to the nearest increment to find the weight increment, WI.

2. Contrast: Take the value zero as one extreme and the value obtained for the Broadway typeface as the other extreme, and divide into 16 increments assigning digital values 0–15. Round CF to the nearest increment to find the contrast increment, CI.

3. Regularity: Take zero as the lower extreme and the value obtained for the Broadway typeface as the upper extreme and divide it into 12 increments, 0–11. Round RF to the nearest increment to find the Regularity Increment, RI.

4. Narrowness: Take the value obtained for the Trade Gothic Extra Condensed typeface as the lower extreme and the Eurostile Bold Extended typeface as the upper extreme and divide into 8 increments, 0–7. Round NF to the nearest increment to find the Narrowness Increment, NI.

5. X-height: Take the value obtained for the Englische Schreibeschrift typeface as one extreme and the Helvetica Compressed typeface as the other extreme and divide into 8 increments, 0–7. Round XF to the nearest increment to find the X-height Increment, XI.

6. Serif/Sanserif: Take the value obtained for the BroadWay typeface as one extreme and the Lubalin Graph Ultra typeface as the other extreme and divide into 8 increments, 0–7. Round SF to the nearest increment to find the Serif/Sanserif increment, SI.

The increment total, TI, for a specified typeface is the sum of the six scaled increments calculated above;

$$TI=WI+CI+RI+NI+XI+SI.$$

The suitability of a specified typeface to be utilized as a heading face with a given textface is a function of the contrast between the two typefaces. The increment total, TI, for both proposed typefaces, TY and TX, respectively, is calculated and one subtracted from the other. If the difference between the two typeface TIs is 6 or fewer increments, the proposed typefaces are too similar to provide sufficient contrast to be an allowable pair. If the difference is greater than six increments, the typefaces have sufficient differences to be used together to provide an effective text/heading typeface pair.

Additionally, if a proposed typeface TY is to be used as an accent typeface in a body of text in typeface TX, each of four selected increments must be examined. If one or more of the increments is sufficiently extreme, as determined by the following criteria (Table II), the typeface may be used as an accent face.

TABLE II

| |
|---|
| WI = 1, 2, 18 or 19; |
| CI = 14 or 15; |
| RI = 10 or 11; and |
| XI = 0 or 7. |

It is to be noted that the selection and number of typeface comparison factors and the threshold values for contrast and extremity are completely arbitrary and are defined by the user providing the standard model and designing the desired standard document formats. Similarly, the selection of various predefined typefaces to define an incremented scale for each of the comparison factors is arbitrary and specified by the expert designer when defining the standard model.

Figure 5A:
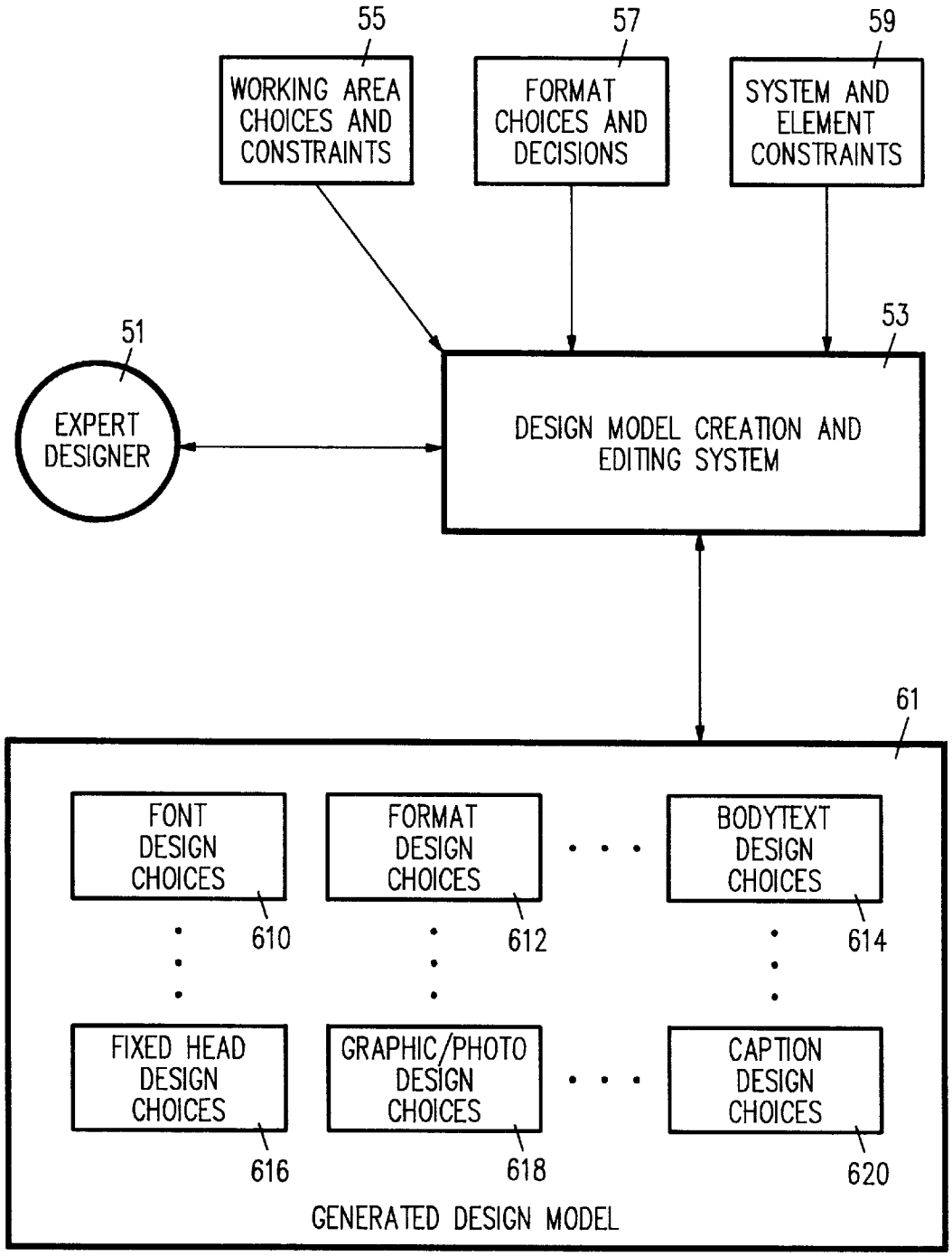
FIG. 5a is a flow diagram illustrating the process for generating design models for use in a software implementation of a preferred embodiment of the present invention.
Figure 5B:
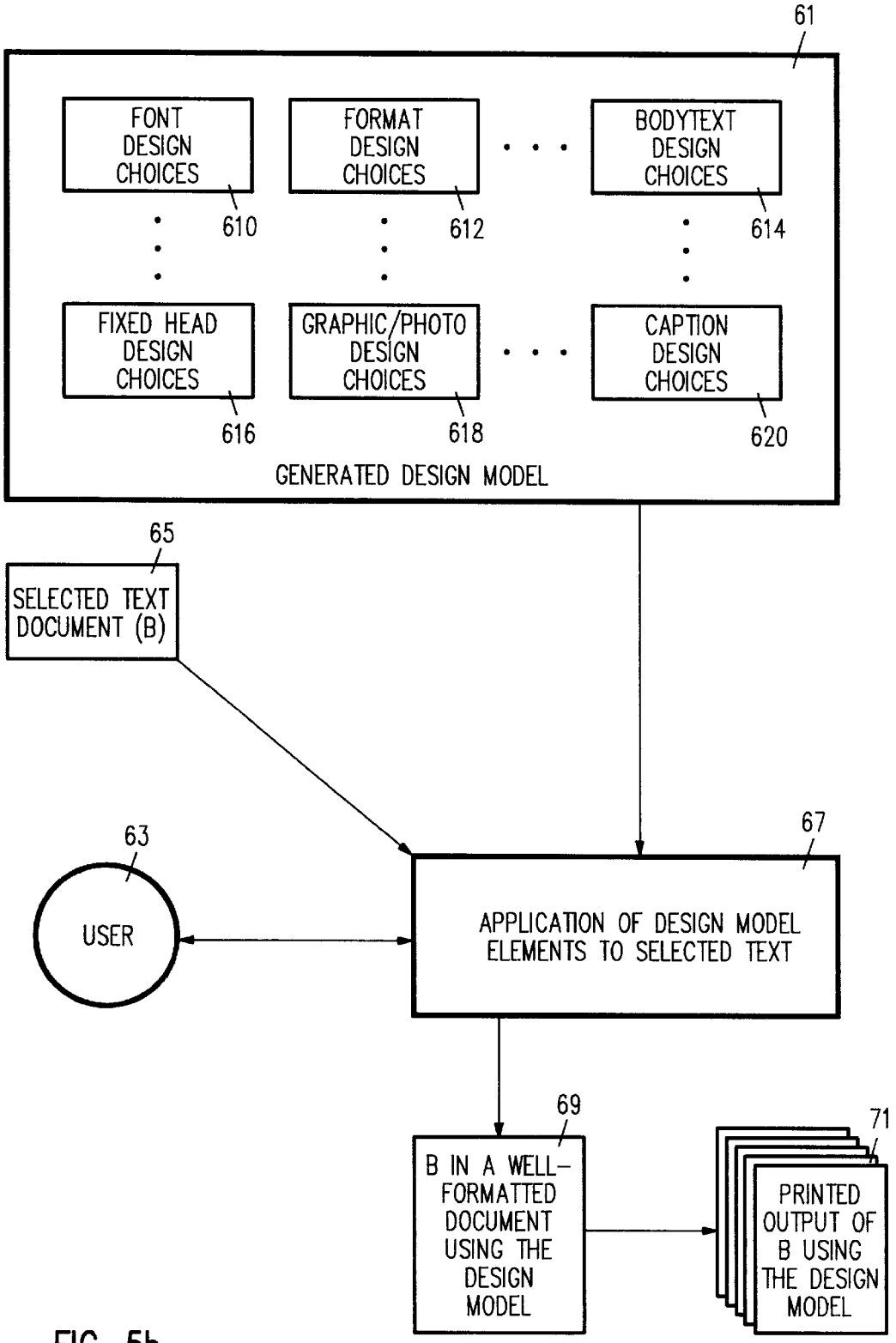
Figure 6A:
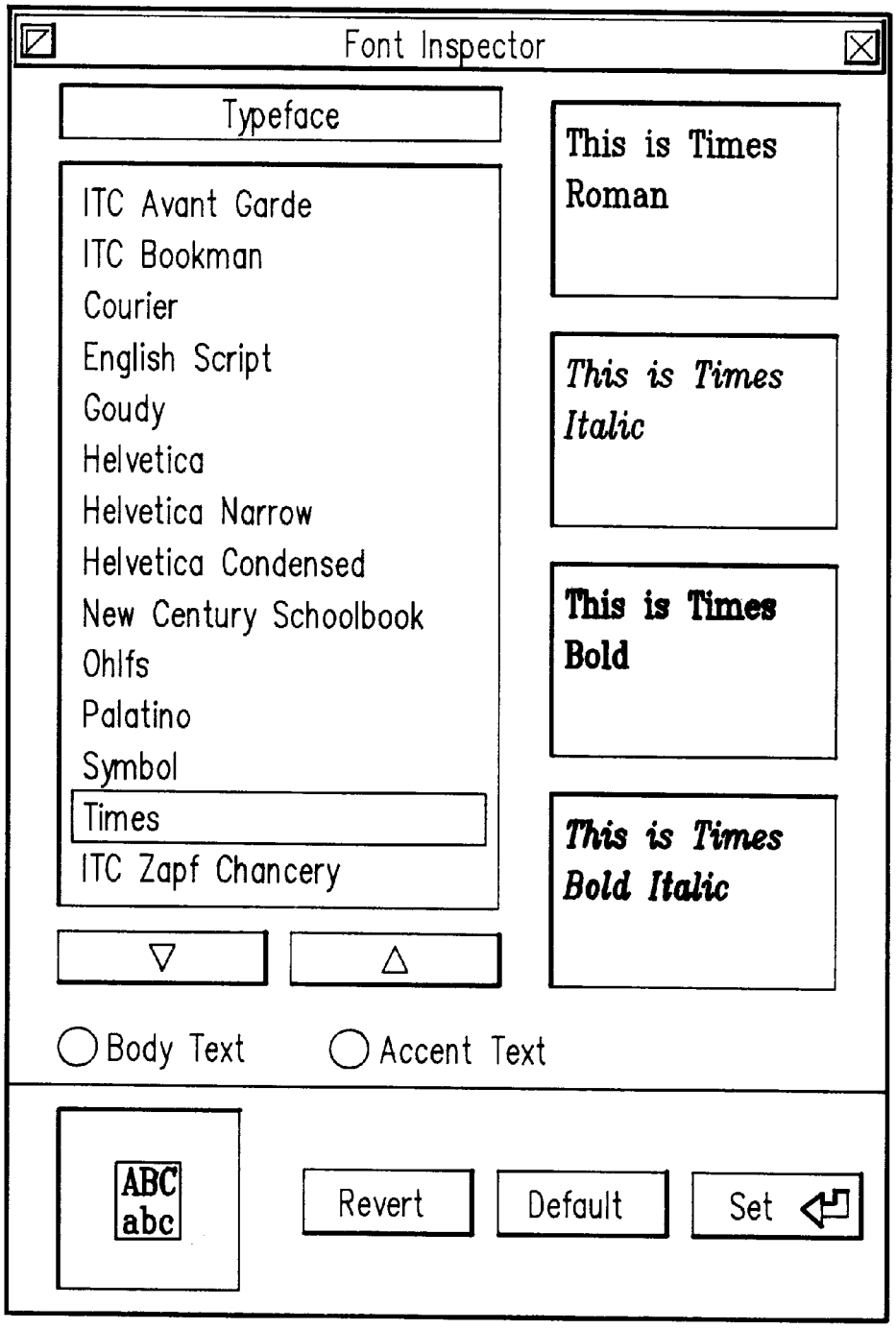
FIGS. 6a–6f are diagrams illustrating selected command screen displays utilized in the production of documents as shown in FIGS. 5a and 5.
Figure 6B:
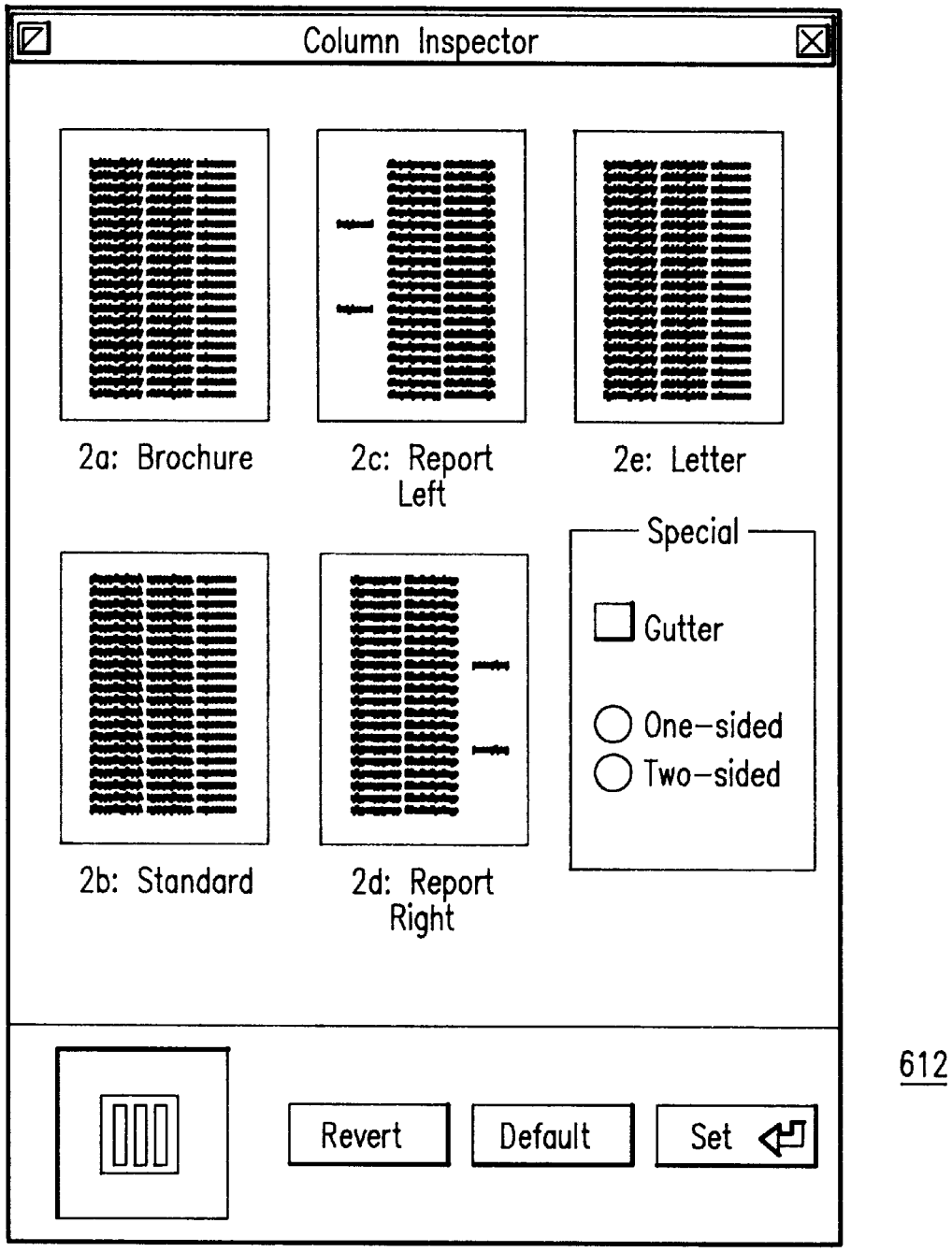
Figure 6C:
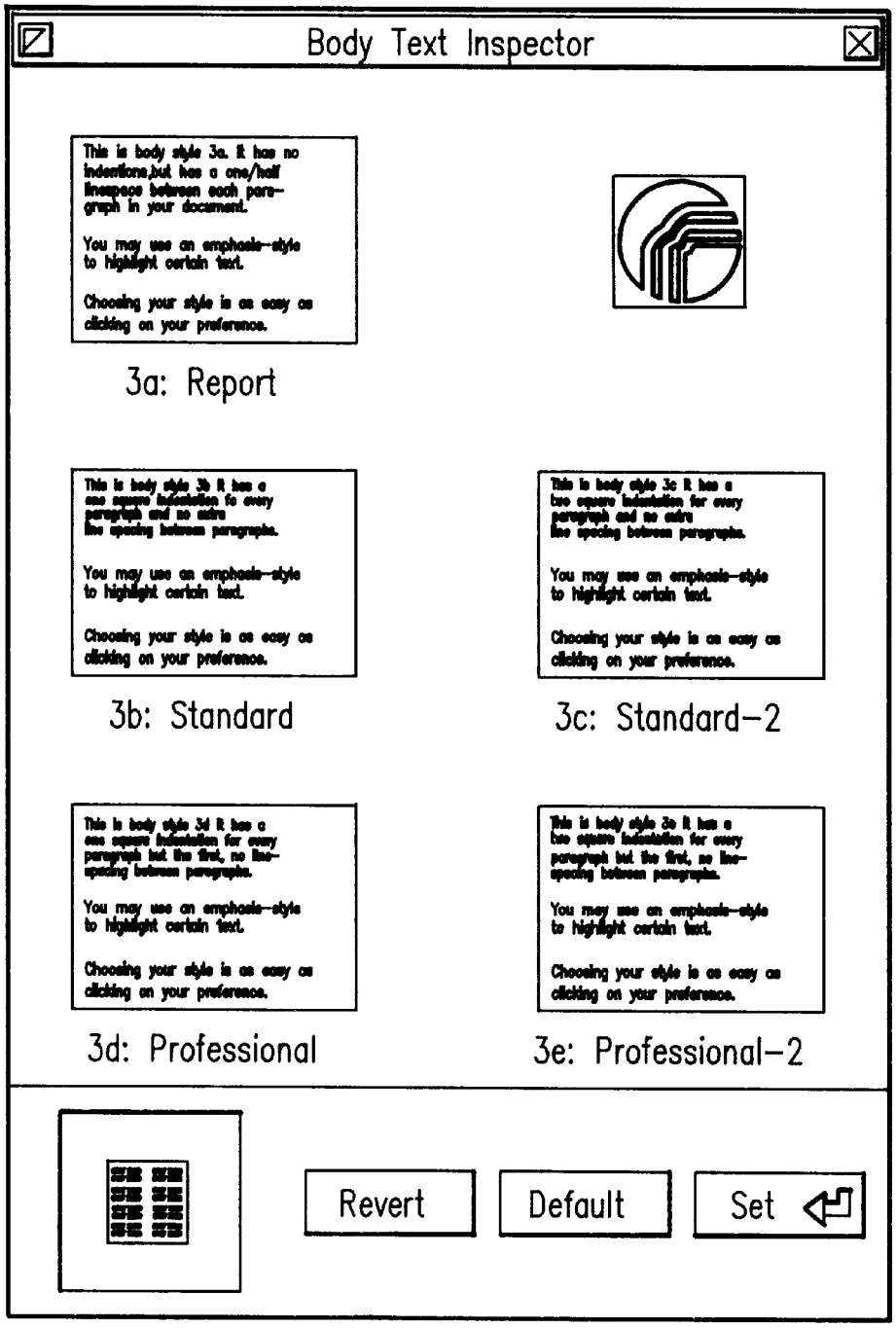
Figure 6D:
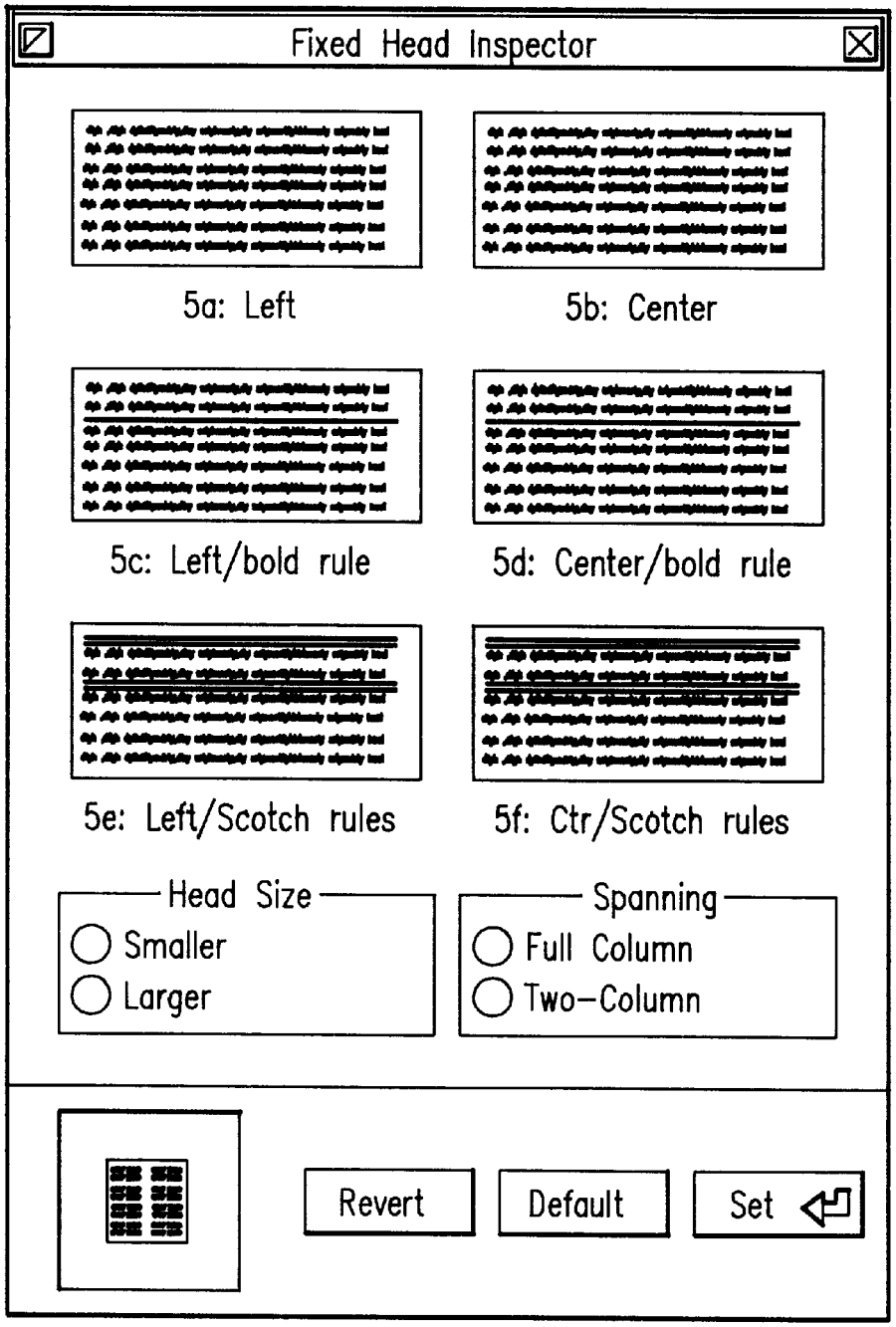
Figure 6E:
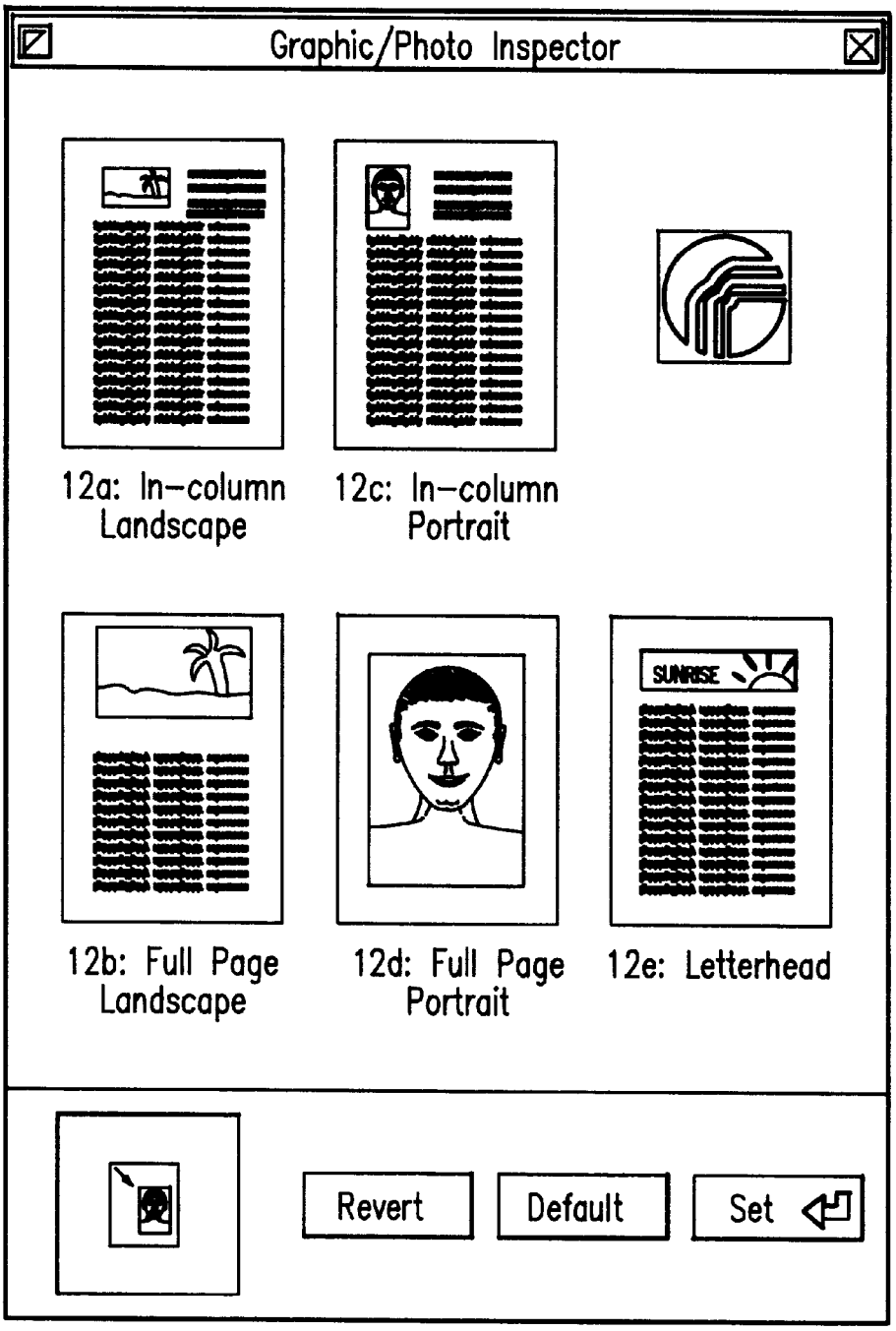
Figure 6F:
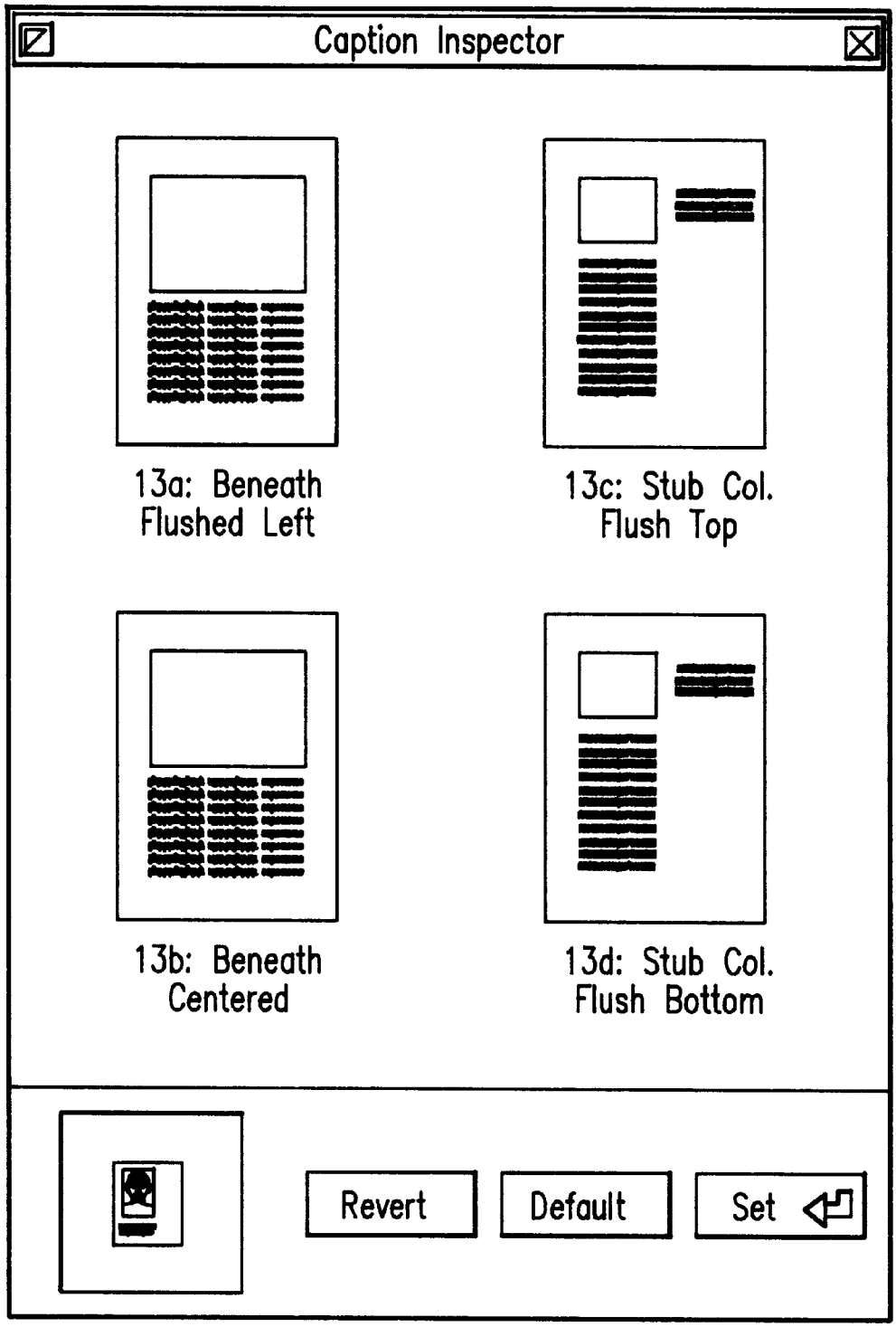

Referring now also to FIGS. 5a,5b and 6a–6f, the software implementation of one preferred embodiment of the present invention provides a computer program including a visual interface which leads the user through a series of design choices to enable the typographically unskilled user to produce a well-formatted and professional-looking document. FIGS. 5a and 5b are a flow diagram illustrating a computer program which provides visual screens as shown in FIGS. 6a–6f to allow a user to design and format a desired document having a predefined style.

As described with reference to FIG. 2a hereinabove, FIG. 5a is a diagram illustrating the process by which a typographical designer 51 (which may be an expert or experienced typographer) generates one or more design models 61 to provide a user 63 with a series of choices for each of several design elements to produce a user-designed document in a selected predetermined format. Utilizing a model creation and editing process 53 (as shown in FIG. 2a) an expert designer 51 combines text area design elements 55 with the associated image composition system design elements 59 to provide a design model 61 for one or more selected document formats 57. The design model creation and editing process 53 includes the process of selecting a standard font $T_0$ and generating a table of values 35 associated with a selected format $F_j$. The creation and editing process 53 also includes the further processes of designing tables of user selectable choices for typeface selection 610, format design 612, body text design 614, heading design 616, graphic design 618 and caption design 620, for example. In one preferred embodiment, a total of 21 design elements are defined. Each of the defined design element choice tables included in the design model 61 are supported by sets of design rules providing for automatic compensation and interaction with all other design elements in a given format $F_j$.

A completed design model 61 then may be accessed by a user 63 to produce a document 69 having desired text 65 set in a selected format $F_j$. As described with reference to FIG. 2b hereinabove, a user 63 accesses table 61 via a computer keyboard or other input device such as a mouse (not shown) utilizing a document design process 67. The document design process 67 automatically integrates the user 63 choices for typeface 610, format 612, body text 614, heading design 616, graphic design 618, and caption design 620, for example, (as shown in FIGS. 6a–6f, respectively) in accordance with the predefined rules associated with the design model for the selected format $F_j$ to provide a user designed document 69.

The typeface selection table 610 comprises a list of different typefaces which may be defined by the expert designer and actually packaged with the system or alternatively, the typeface selection table 610 may be ported to a host computer memory, such as a disc drive, where the user 6 may provide any set of typefaces desired. As described above, one a set of values 35 have been defined associating a standard font $T_0$ with a selected format, $F_j$, any typeface may be substituted.

Figure 7A:
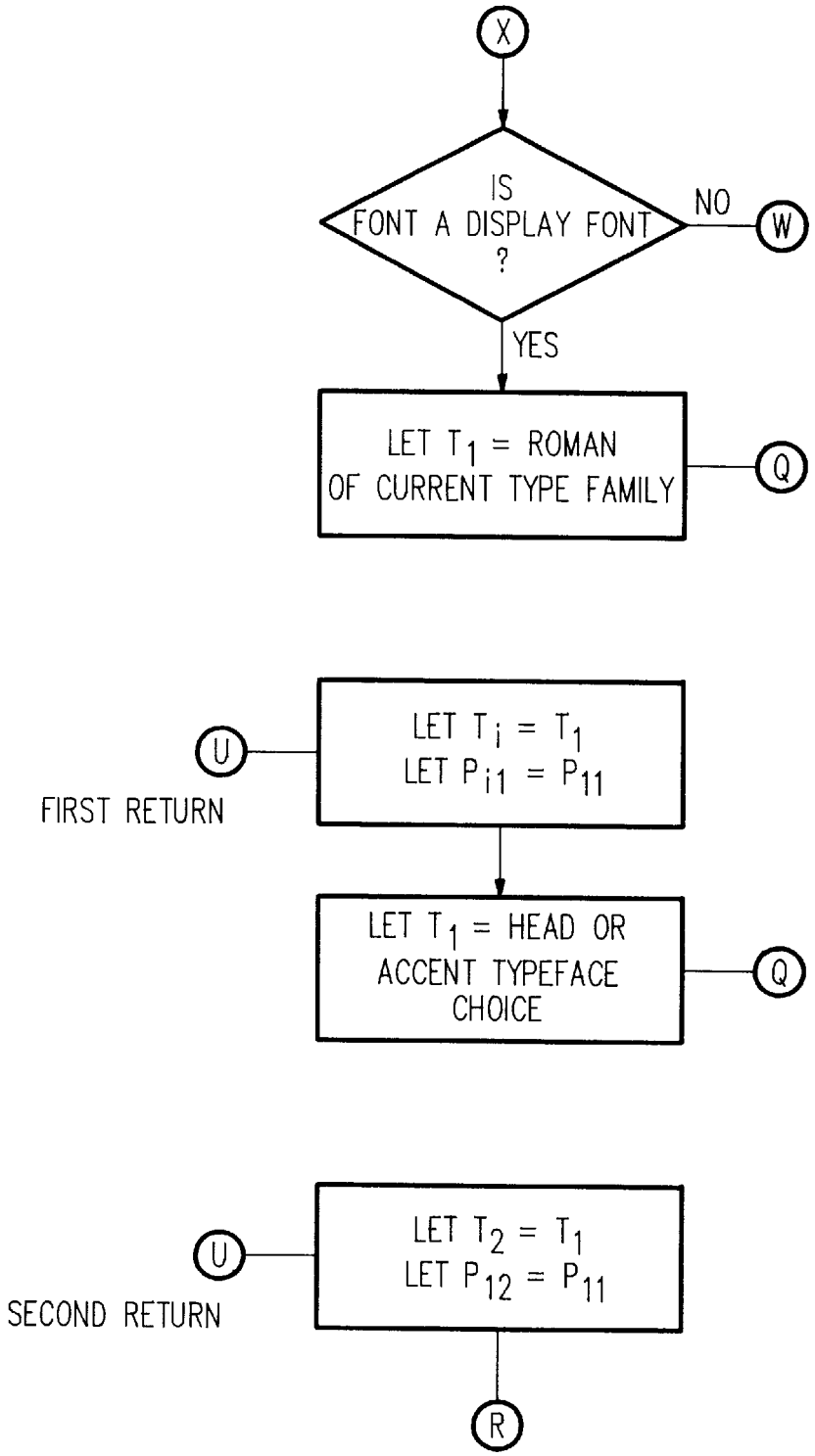
FIGS. 7a–7k are flow charts illustrating a computer program for the document production process according to a preferred embodiment of the present invention.
Figure 7B:
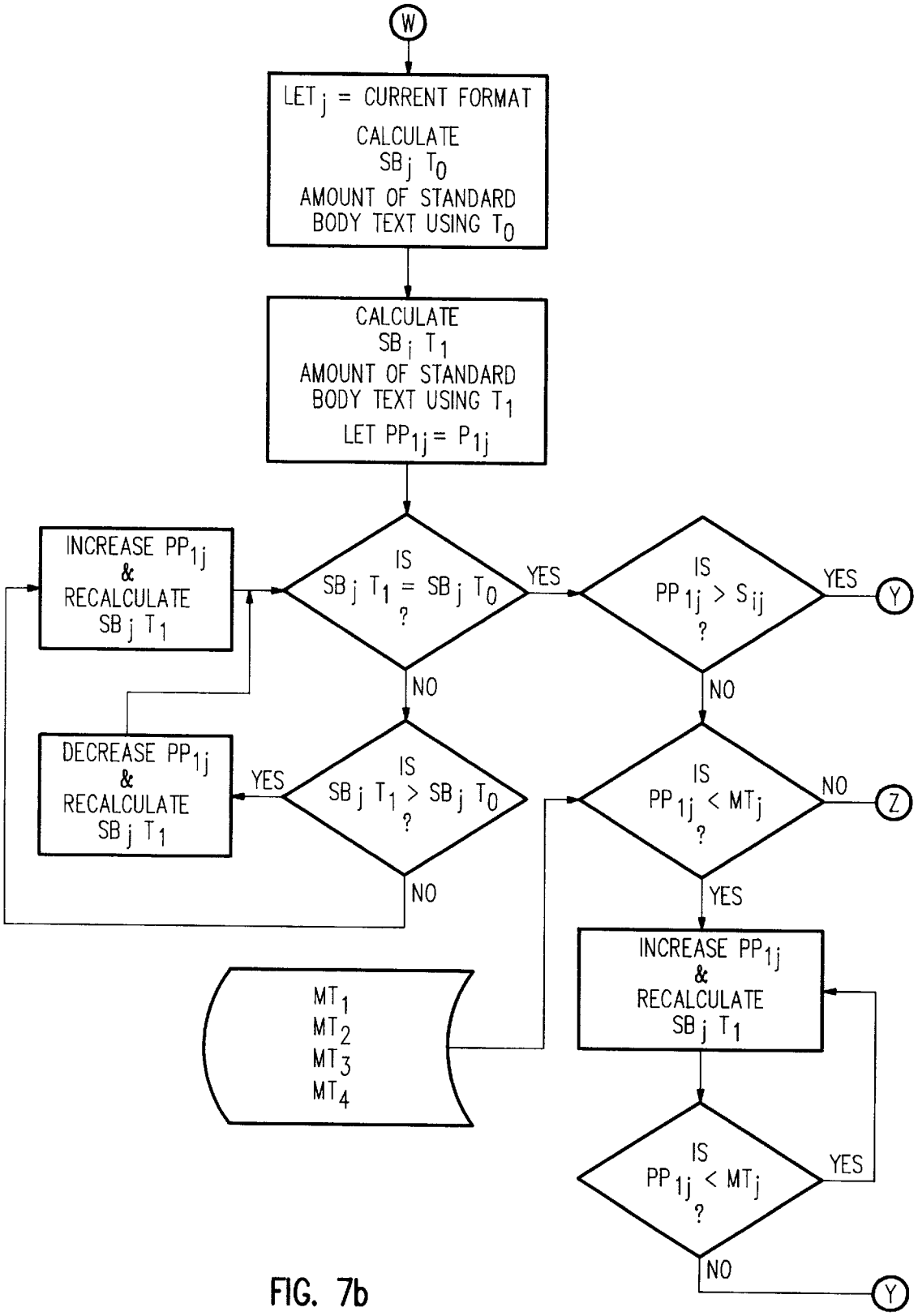
Figure 7C:
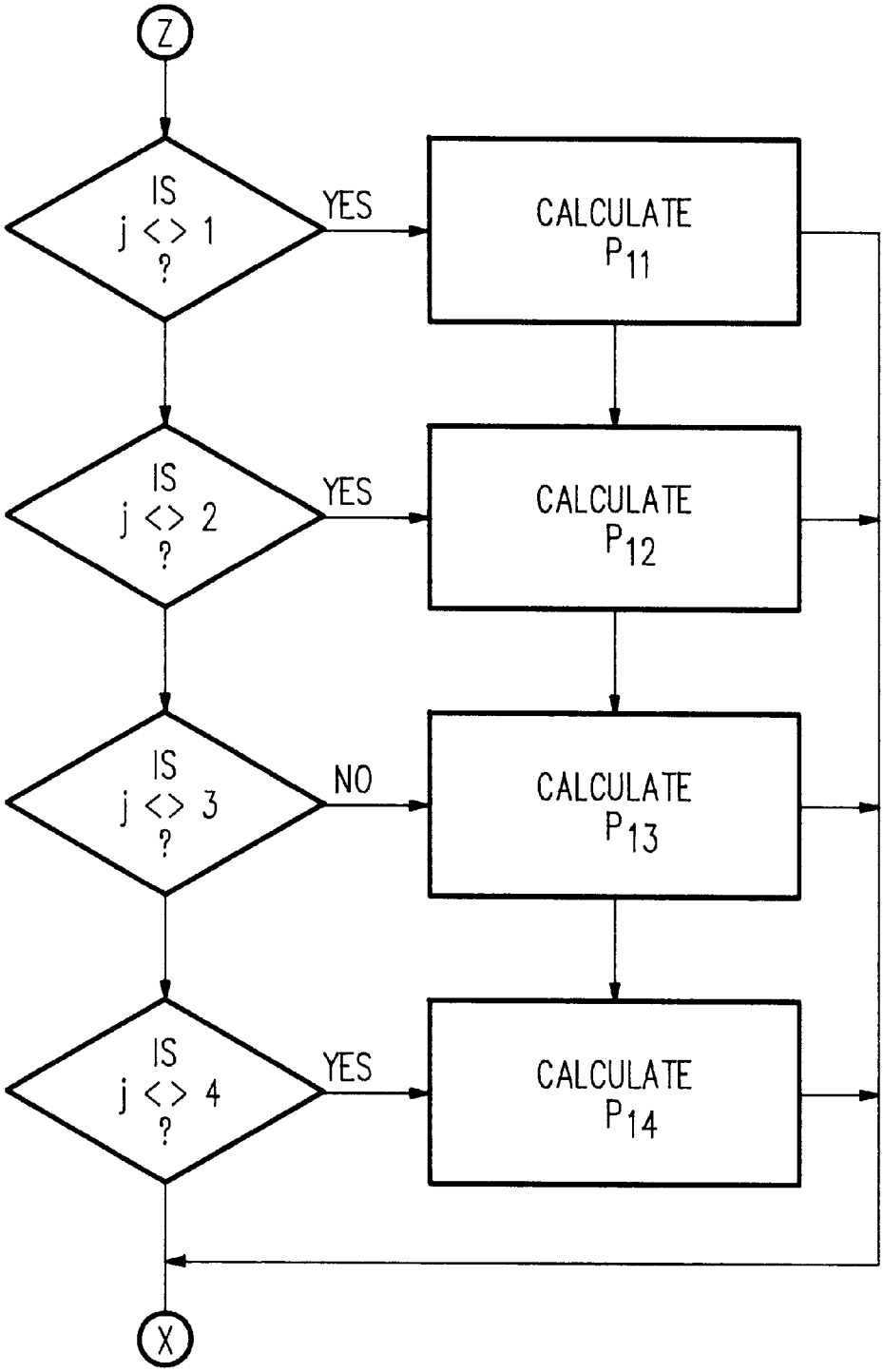
Figure 7D:
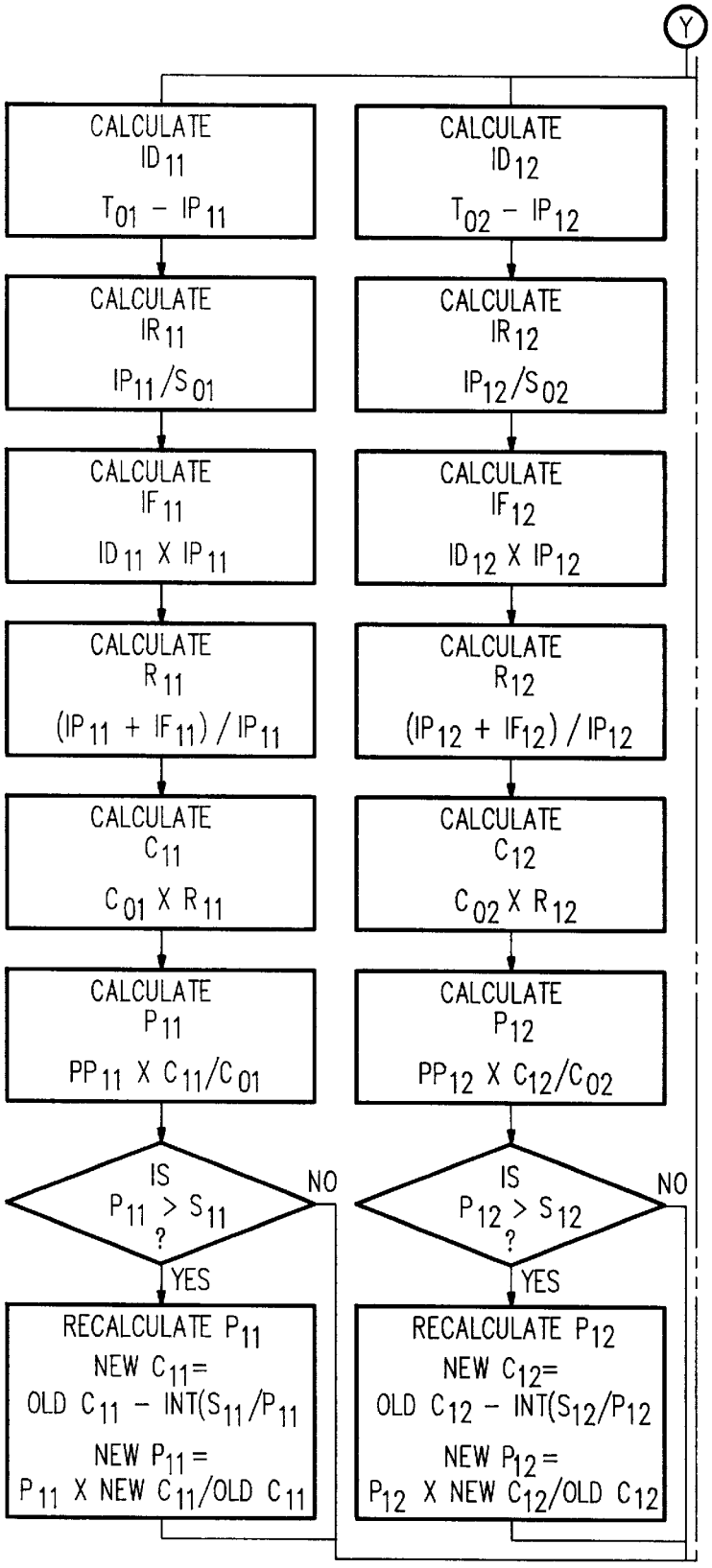
Figure 7E:
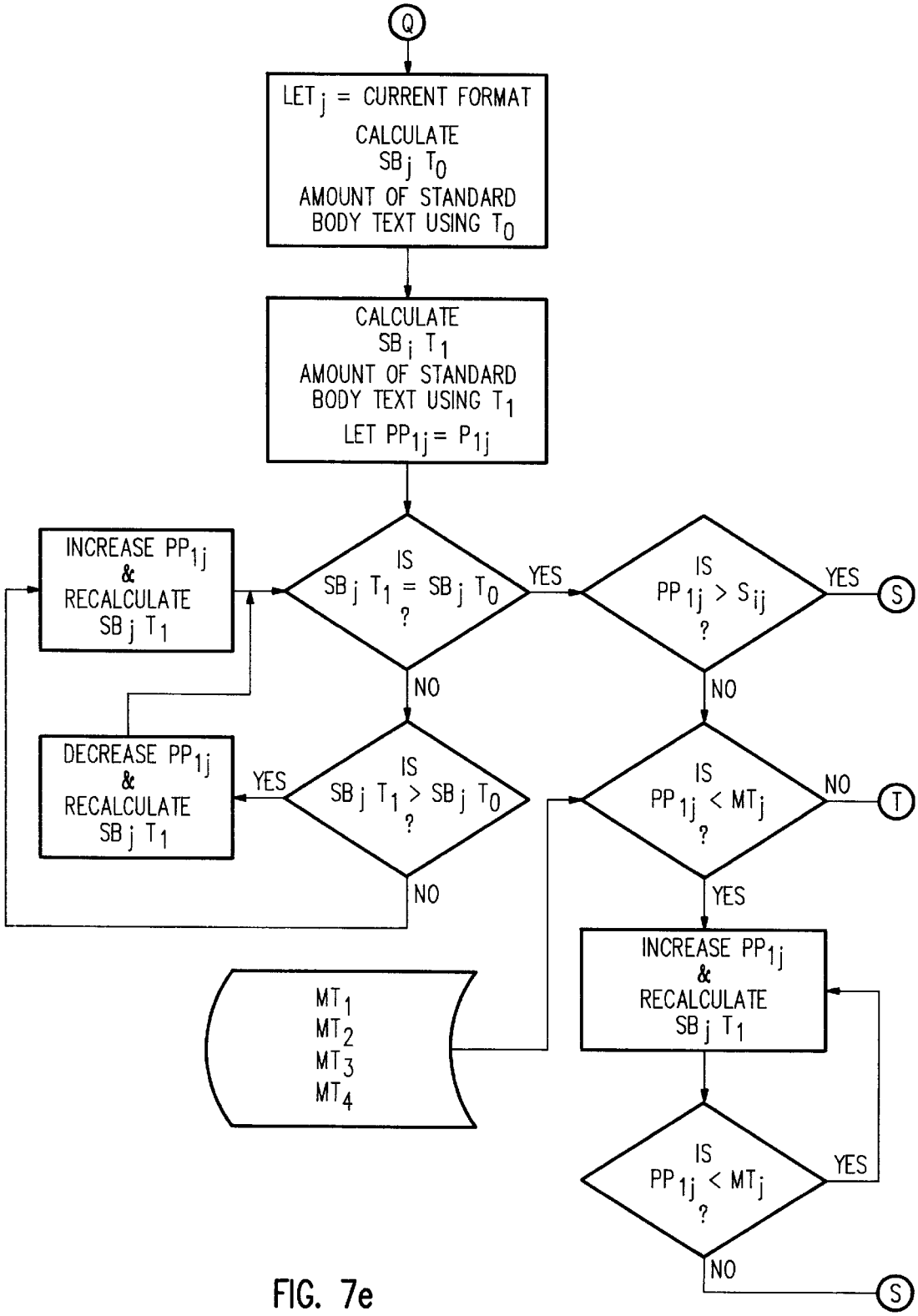
Figure 7F:
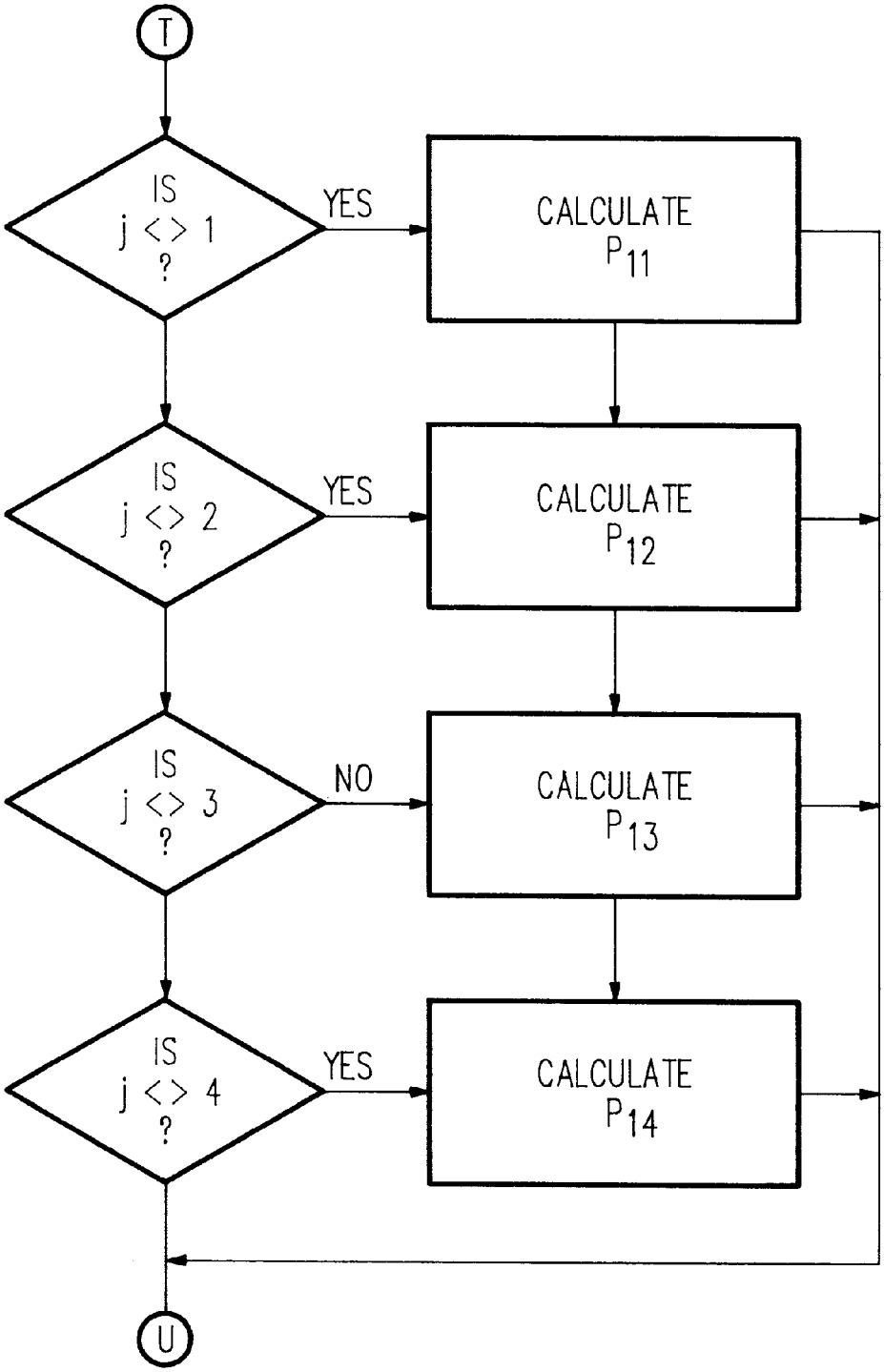
Figure 7G:
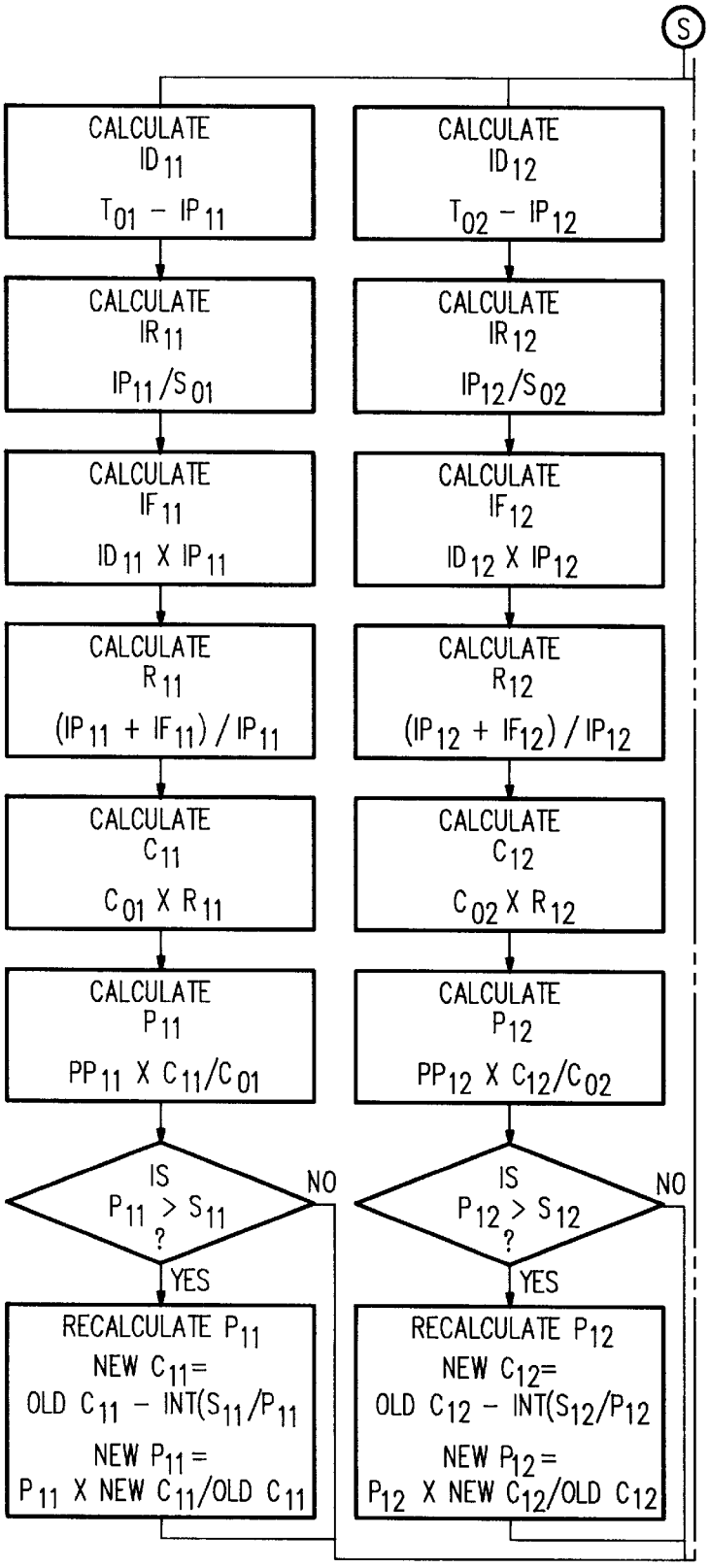
Figure 7H:
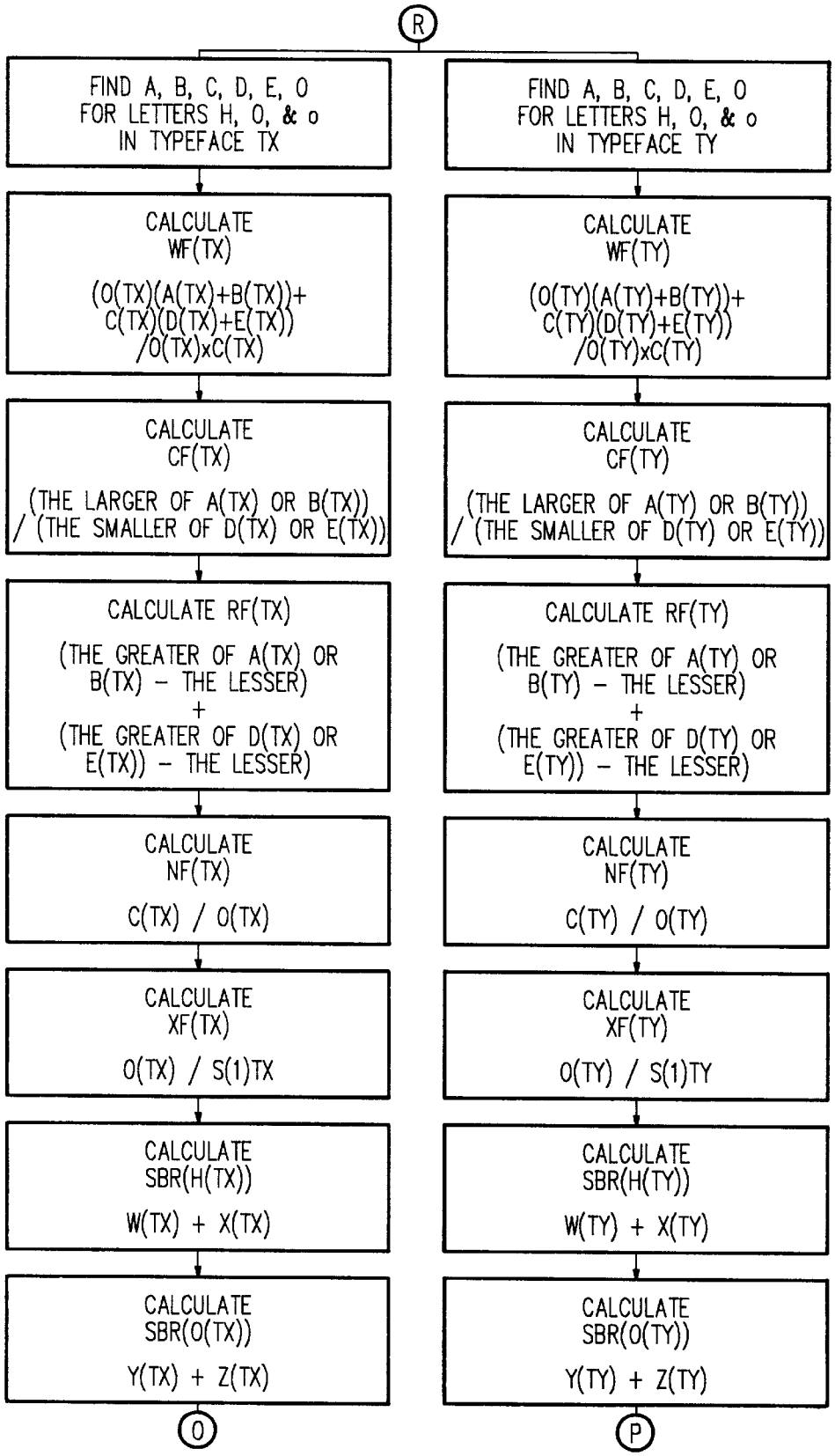
Figure 7I:
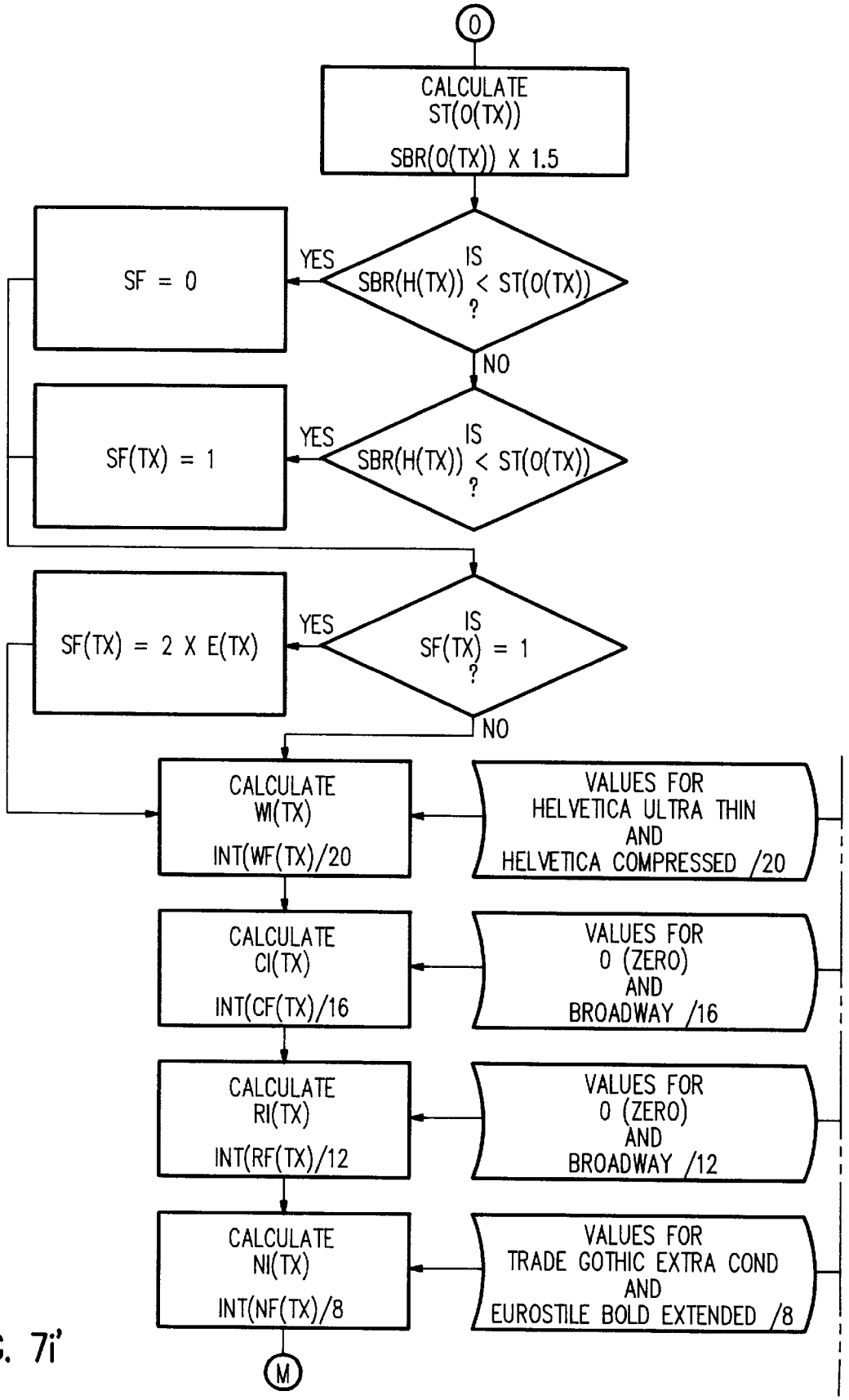
Figure 7J:
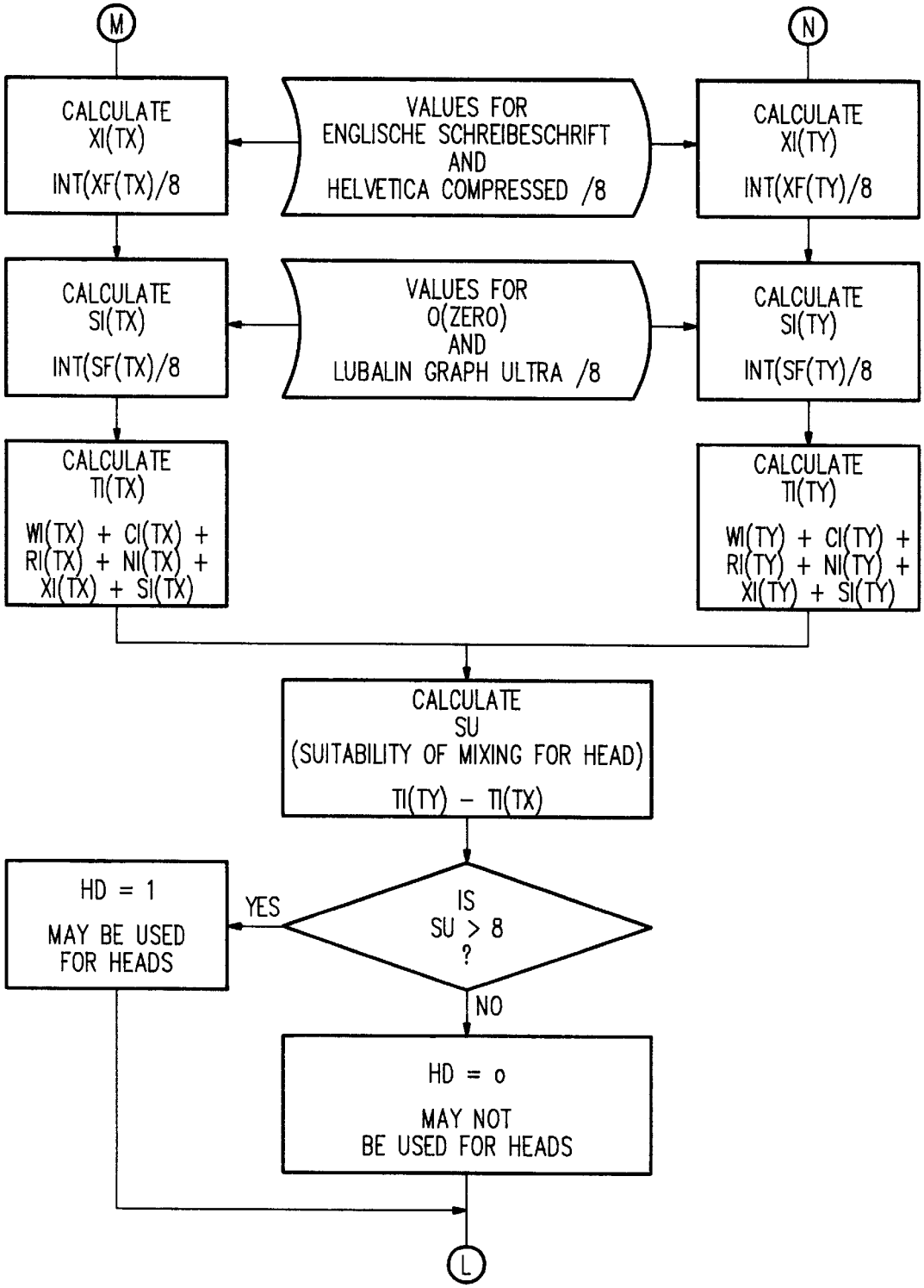
Figure 7K:
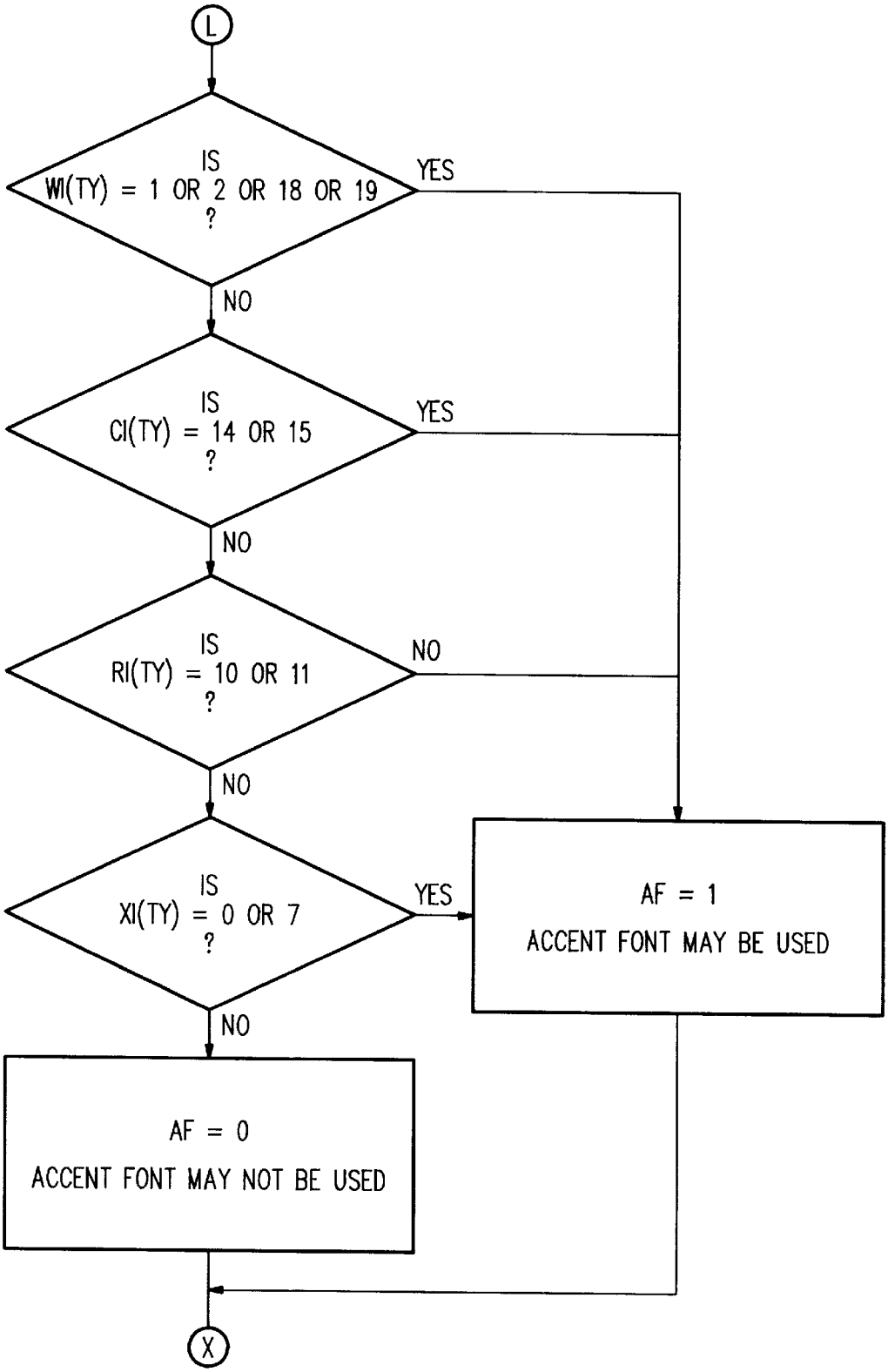

While the user 63 is provided a table of choices for each of the defined document design elements, it is not necessary that the user 63 make a selection for each defined design element. A default selection is defined for each design element should the user 63 not make a choice for that particular design element. The system automatically compensates for default design elements as a function of the user's selected design elements. The number and types of design elements defined is a choice of the expert designer 51 and may be as few or as many as required by the expert designer 51 to achieve the readability and style of document desired. Referring now also to FIGS. 7a–7k, a flow chart illustrating a computer program implementing a preferred embodiment of the present invention is shown. FIGS. 7a–7g illustrate the user document design process 67 described with reference to FIGS. 2b and 6b. FIGS. 7h–7j illustrate a selection of text/heading typeface pairs as described with reference to FIGS. 4a and 4b. FIG. 7k illustrates the selection process for an accent typeface. The computer program allows a user 63 to make design parameter choices from screen displays exemplified in FIGS. 6a–6f as described above. The program automatically accesses the stored design model 61 to allow the user 63 to produce a professional, well formatted document 69 by merely typing in, or otherwise entering, the selected text 65 once the desired parameters have been selected from the design model 61. Once the selected text has been entered in a selected format, a document format 69 may be changed at any time by user selected parameters. For example, when the user 63 selects an alternate typeface from the font design table 610, the system 67 automatically reformats the document 69 utilizing the newly selected font in accordance with predefined rules to provide a new document 69 having substantially identically readability and copyfit (i.e., physical length) as the original document. The program is ported to a printer (not shown) to produce a printed output 71 of the desired document 69.

The preferred embodiment software is implemented to be compatible with current operating systems such as MS DOS and is completely compatible with current available microprocessors and personal computers. The computer program includes all necessary resource models or alternatively utilizes existing host computer graphics, display screen and other provided resources. Program output is compatible with most available printer peripherals via host computer and application printer drivers.

While the present invention has been particularly shown and described with respect to certain preferred embodiments thereof, it should be readily apparent to those of ordinary skill in the art that various changes and modifications in form and details may be made without departing from the spirit of the invention and the scope of the appended claims.

We claim:

1. A method for automatic typographic design of a [printed] document comprising the steps of:

selecting a standard font from a selected typeface;

setting a standard body of text in a selected format in said standard font;

selecting an interline spacing for said standard body of text and the type size of said standard font to provide a standard style for said standard body of text in said selected format;

selecting a desired typeface;

setting a desired body of text in said desired typeface in said selected format, adjusting the type size of said desired typeface such that a selected parameter of said desired body of text set in said desired typeface is substantially equal to said selected parameter of said desired body of text in said standard font and said selected interline spacing; and adjusting the interline spacing of said desired body of text such that the ratio of the interline spacing in said desired body of text to the height of a selected character in said desired typeface is substantially equal to the ratio of the interline spacing in said standard body of text to the height of said selected character in said standard font.

2. A method as in claim 1 further including the steps of:

determining the integer number of lines of said desired body of text in said selected format;

re-adjusting the interline spacing of said desired body of text in said selected format as a function of said integer number of lines; and adjusting the size of said desired typeface such that the ratio of said readjusted interline spacing to the height of said selected character in said desired typeface is substantially equal to the ratio of the interline spacing in said standard body of text in said selected format to the height of said selected character in said standard format.

3. A method as in claim 1 further including the steps of:

determining the integer number of lines of said desired body of text in said selected format;

readjusting the interline spacing of said desired body of text in said selected format as a function of said integer number of lines of text; and adjusting the size of said desired typeface such that the number of characters of desired text in said selected format in said desired typeface is substantially equal to the number of characters of desired text in said standard format set in said standard font in said standard style.

4. A method for automatic typographic design of a [printed] document comprising the steps of:

selecting a format;

selecting a standard font from a selected typeface;

selecting a standard interline spacing for said standard font in said selected format;

selecting a desired typeface;

setting a desired body of text in said desired typeface in said selected format, the type size of said desired typeface being such that the ratio of the height of the lowercase characters in said desired typeface to a selected interline spacing for the desired typeface will be the same as the ratio of the height of the lowercase characters of said standard font to said standard interline spacing in said selected format, the type size of said desired typeface being such that a substantially equal amount of said desired body of text will fit within a column of said selected format in said desired typeface and the interline spacing for the desired typeface and within a column of said selected format in said standard font and said standard interline spacing.

5. A method for automatic typographic design of a [printed] document comprising the steps of:

selecting a standard font from a selected typeface selecting a desired format;

selecting a standard interline spacing for use with said standard font in said format, setting a standard body of text in columns of said selected format in said standard font utilizing said standard interline spacing;

selecting a desired typeface;

setting a desired body of text in said desired typeface in said selected format, adjusting the type size of said desired typeface such that the ratio of the height of the lowercase characters in the desired typeface to a selected interline spacing for desired typeface substantially equals the ratio of the height of the lowercase characters in said standard font to said standard interline spacing such that the amount of said desired text set in a column of said selected format in said desired typeface substantially equals the amount of desired text set in said column in said standard font utilizing said standard interline spacing.

6. A method as in claim 5 including the further step of adjusting the type size of said desired typeface such that the amount of said desired text set in a column of said selected format in said desired typeface equals a predetermined relationship to the amount of desired text set in said column in said standard font utilizing said standard interline spacing.

7. A method for selecting contrasting typefaces for use in a text-heading combination within a [printed] document, said method comprising the steps of:

selecting a pair of typefaces for use within a printed document wherein one of said pairs of typefaces is utilized for setting text and the other one of said pair of typefaces is utilized for setting headings;

selecting at least one common character from said pair of typefaces; measuring preselected dimensions of one or more character parameters for each said selected character in each of said pair of typefaces; and comparing said measurements of said character parameters for each character in each typeface in accordance with predetermined criteria to define pairs of typefaces having sufficient visual contrast therebetween for use as a text-heading combination within said [printed] document.

8. A method as in claim 7 wherein the step of selecting a pair of typefaces includes the step of determining equivalent type sizes for each of said typefaces, said typefaces to be compared for contrast at said equivalent type size.

9. A method as in claim 8 wherein the step of measuring preselected dimensions of said character parameters includes the step of assigning a numerical value to each of said measurements.

10. A method as in claim 9 wherein said numerical value is assigned to each of said measurements in accordance with a predefined numerical scale defined over a range of values representing a range between opposite extremities for each said character parameter.

11. A method as in claim 9 including the steps of:

summing said assigned numerical values for all said measurements for each selected character to provide a total value for each character for each typeface in said pair of typefaces; and comparing said total value for each selected character in one typeface to the total value for the common selected character in the other typeface in accordance with predefined criteria for defining allowable pairs of typefaces having sufficient visual contrast therebetween for use as a text-heading combination within said [printed] document.

12. A method as in claim 8 wherein the step of comparing said measurements of said character parameters include the steps of:

calculating at least one predefined comparison factor associated with each said selected character in each said typeface, the value of each of said comparison factors being a function of the measurement for at least one of said character parameters; and comparing the sum of all said comparison factors for each said character in one typeface with the sum of all said comparison factors for the common character in the other typeface.

13. A method as in claim 12 wherein the step of calculating said predefined comparison factors includes the steps of:

assigning a numerical value to each of said measurements; and scaling the value of each said comparison factor in accordance with a predefined numerical scale, said predefined numerical scale defined over a range of values representing a range between opposite extremities for each of said predefined comparison factors.

14. A computer software system for typographic design of a [printed] document comprising:

at least one document design model for providing a user a plurality of choices for each of several document design elements, each document design model associated with at least one predefined document format; and a set of instructions providing a document design process responsive to user input commands for accessing said document design model and integrating user choices for each of said plurality of document design elements for providing a user document having user input text set in a user selected typeface in a user selected predefined document format associated with said document design model.

15. A computer sofward system as in claim 14 wherein each said document design model comprises:

a plurality of design element tables, each of said design element tables for providing at least one user choice for a specified design element associated with that design element table, each said design element table defining a default choice for said associated design element; and a plurality of sets of predefined design rules, each said design rule set associated with at least one design element table, said design rule set defining the [user] *use* of and interaction with other design elements of said associated design element in said associated predefined document format.

16. A computer software system as in claim 15 wherein said document design process accesses a computer monitor for providing visual screens displaying visual images to a user representing said design element choices for each said design element table.

*17. A method according to claim 1 further comprising storing the resulting document in a machine-readable form.*

*18. A method according to claim 1 further comprising printing the resulting document.*

*19. A method according to claim 1 further comprising displaying the resulting document on a computer display screen.*

*20. A computer software system according to claim 14 further comprising means for storing the resulting user document in a machine-readable form.*

*21. A computer software system according to claim 14 further comprising means for outputting the resulting user document to a printer for printing.*

*22. A computer software system according to claim 14 further comprising means for displaying the resulting user document on a computer display screen.*

*23. A computer software system according to claim 14 wherein the said document design process integrates a user choice for related design elements.*

*24. A computer software system according to claim 14 wherein the said document design process integrates a user choice for font design elements.*

*25. A computer software system according to claim 14 wherein the said document design process integrates a user choice for title and heading design elements.*

*26. A computer software system according to claim 14 wherein the said document design process integrates a user choice for caption design elements.*

*27. A computer software system according to claim 15 further comprising means for storing the resulting user document in a machine-readable form.*

*28. A computer software system according to claim 15 further comprising means for outputting the resulting user document to a printer for printing.*

*29. A computer software system according to claim 15 further comprising means for displaying the resulting user document on a computer display screen.*

*30. A computer software system according to claim 15 wherein said design rule set provides for constraining at least one choice in at least one design element.*

*31. A computer software system according to claim 15 wherein at least one design rule set provides for automatic compensation of a selected design element responsive to said user choice for a specified design element other than the selected design element.*

*32. A computer software system according to claim 15 wherein at least one of the design rule sets effects automatic selection of at least one of said design elements in response to a single user choice for another one of the design elements.*

*33. A computer software system according to claim 15 wherein at least one of the design rule sets provides for automatic compensation of each occurrence of at least one selected design element responsive to user input.*

*34. A computer software system according to claim 15 wherein said interaction with other design elements, as defined by said design rule set, includes compensating the design of the corresponding default choice for said associated design element responsive to the user choice for one of said other design elements.*

*35. A computer software system according to claim 15 wherein said interaction with other design elements, as defined by said design rule set, includes compensating the design of the corresponding default choice for said associated design element responsive to the default choice defined by the design element table for one of said other design elements.*

*36. A computer software system according to claim 15 wherein said interaction with other design elements, as defined by said design rule set, includes compensating the design of said user's choice for said associated design element responsive to the default choice for one of said other design elements.*

*37. A computer software system according to claim 15 wherein said interaction with other design elements, as defined by said design rule set, includes compensating the design of said user's choice for said associated design element responsive to the user's selection of one of the user choices provided by the corresponding design element table for one of said other design elements.*

* * * * *

UNITED STATES PATENT AND TRADEMARK OFFICE

CERTIFICATE OF CORRECTION

PATENT NO. : Re. 36,704
DATED : May 16, 2000
INVENTOR(S) : Parker, et al

It is certified that error appears in the above-identified patent and that said Letters Patent is hereby corrected as shown below:

Title page [73] should reflect the Assignee as: Michael R. Parker, 1413 NW 63rd Street, No. 2, Seattle, Washington 98107.

Title page [76] should indicate the current address of inventor Michael R. Parker at the time of issuance as: 1413 NW 63rd Street, No. 2, Seattle, Washington 98107.

Column 1, line 42, "sue" should read --use--.

Column 5, line 35, "test/heading" should read --text/heading--.

Column 5, line 59, "hundred" should read --hundreds--.

Column 9, Table I, in line starting with "$C_{ij}$", "$T_i$" should read --$T_j$--.

Column 10, line 16, "front" should read --font--.

Column 10, line 18, "have" should read --has--.

Column 18, line 6, delete "printed".

UNITED STATES PATENT AND TRADEMARK OFFICE

CERTIFICATE OF CORRECTION

PATENT NO. : Re. 36,704
DATED : May 16, 2000
INVENTOR(S) : Parker, et al

It is certified that error appears in the above-identified patent and that said Letters Patent is hereby corrected as shown below:

Column 19, line 15, "softward" should read --software--.

Signed and Sealed this

Twenty-fourth Day of April, 2001

*Attest:*

Nicholas P. Godici

NICHOLAS P. GODICI

*Attesting Officer*

*Acting Director of the United States Patent and Trademark Office*